(12) United States Patent
Oka et al.

(10) Patent No.: US 11,390,037 B2
(45) Date of Patent: Jul. 19, 2022

(54) LASER WELDED BODY

(71) Applicant: Mitsubishi Engineering-Plastics Corporation, Minato-ku (JP)

(72) Inventors: Akihiro Oka, Kiryu (JP); Yuki Hiwatashi, Hiratsuka (JP); Yasushi Yamanaka, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 149 days.

(21) Appl. No.: 16/759,900

(22) PCT Filed: Oct. 30, 2018

(86) PCT No.: PCT/JP2018/040260
§ 371 (c)(1),
(2) Date: Apr. 28, 2020

(87) PCT Pub. No.: WO2019/088073
PCT Pub. Date: May 9, 2019

(65) Prior Publication Data
US 2020/0307112 A1    Oct. 1, 2020

(30) Foreign Application Priority Data
Oct. 31, 2017   (JP) .............................. JP2017-209941

(51) Int. Cl.
*B29C 65/16*   (2006.01)
*B29C 65/00*   (2006.01)
(Continued)

(52) U.S. Cl.
CPC .............. *B29C 65/16* (2013.01); *B29C 66/71* (2013.01); *B32B 27/20* (2013.01); *B32B 27/36* (2013.01);
(Continued)

(58) Field of Classification Search
CPC ............................................. Y10T 428/24942
See application file for complete search history.

(56) References Cited

U.S. PATENT DOCUMENTS

2005/0119377 A1    6/2005  Ishii et al.
2005/0165176 A1*   7/2005  Matsushima ........... B29C 66/43
                                                         525/437
(Continued)

FOREIGN PATENT DOCUMENTS

CN       1690121 A      11/2005
JP    2003-292752 A    10/2003
(Continued)

OTHER PUBLICATIONS

International Search Report dated Dec. 11, 2018 in PCT/JP2018/040260 filed Oct. 30, 2018, citing documents AA-AB and AU-AV therein, 1 page.

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

Regarding a laser welded body in which a laser transmissive/absorptive molding member containing a PBT-based material and a laser absorptive molding member containing a PBT-based material are integrated with each other by laser welding, the following laser welded body is proposed as a laser welded body in which a bond strength can be further increased. A laser welded body having a structure in which a member I and a member II are integrally bonded to each other, the member I contains 0.0005 to 5.0 parts by mass, with respect to 100 parts by mass of a polyester-based resin A, of a laser transmissive/absorptive coloring material capable of transmitting and absorbing laser beam, and the polyester-based resin A contains at least a polybutylene terephthalate copolymer resin, the member II contains 0.15

(Continued)

to 10.00 parts by mass, with respect to 100 parts by mass of a polyester-based resin B, of a laser absorptive coloring material not transmitting but capable of absorbing laser beam, and the polyester-based resin B contains (B1) a homo PBT, (B2) a homo PBT-based mixed resin containing a homo PBT, or (B3) a copolymerized PBT-based mixed resin containing a copolymerized PBT.

16 Claims, 3 Drawing Sheets

(51) Int. Cl.
| | |
|---|---|
| *B32B 27/20* | (2006.01) |
| *B32B 27/36* | (2006.01) |
| *B29K 69/00* | (2006.01) |
| *B29K 101/12* | (2006.01) |
| *B29K 67/00* | (2006.01) |
| *B23K 101/18* | (2006.01) |

(52) U.S. Cl.
CPC .... *B23K 2101/18* (2018.08); *B29K 2067/003* (2013.01); *B29K 2067/006* (2013.01); *B29K 2069/00* (2013.01); *B29K 2101/12* (2013.01); *B32B 2250/02* (2013.01); *Y10T 428/24942* (2015.01)

(56) References Cited

U.S. PATENT DOCUMENTS

| | | | |
|---|---|---|---|
| 2009/0136717 A1* | 5/2009 | Kihara | B29C 66/12841 428/174 |
| 2015/0183155 A1 | 7/2015 | Saito | |

FOREIGN PATENT DOCUMENTS

| | | |
|---|---|---|
| JP | 3510817 B2 | 3/2004 |
| JP | 2007-112127 A | 5/2007 |
| JP | 2008-105430 A | 5/2008 |
| JP | 4641377 B2 | 3/2011 |
| JP | 2013-155277 A | 8/2013 |
| JP | 2013-155278 A | 8/2013 |
| WO | WO 2014/007382 A1 | 1/2014 |

* cited by examiner (A)

(B)

(A)

(B)

LASER WELDED BODY

TECHNICAL FIELD

The present invention relates to a laser welded body having a structure in which two members of polybutylene terephthalate-based materials are integrally bonded to each other by laser welding.

BACKGROUND ART

Laser welding is a method in which an overlapping portion of two resin members is irradiated with a laser beam in a thickness direction of the resin members, the laser beam penetrates through one of the resin members and melts the resin member in the vicinity of a boundary between the resin members to form a molten pool between the resin members, and the molten pool is solidified by cooling to bond the resin members to each other.

When such laser welding is employed, not only bonding can be efficiently performed without using a bonding component or an adhesive but also a member in a complicated shape can be easily bonded. Since heat is merely locally applied, a thermal effect on a surrounding portion is very small, and the bonding can be performed without causing a damage through vibration. In addition, a bond strength is high, and airtight bonding can be performed. Therefore, this method is widely employed in bonding of vehicle components, electric/electronic components and the like.

Regarding this type of laser welding, for example, Patent Literature 1 (Japanese Patent Laid-Open No. 2007-112127) discloses the following laser welded body: A laser transmissive/absorptive molding member containing 0.001 to 0.3% by weight of a colorant containing nigrosine alone and a thermoplastic resin is overlapped with a laser absorptive molding member containing 0.1 to 5% by weight of another colorant including nigrosine and/or carbon black and a thermoplastic resin, and the resulting overlapped members are welded and integrated by heat generated through irradiation with the laser beam to obtain the laser welded body.

Besides, Patent Literature 2 (Japanese Patent Laid-Open No. 2013-155277) discloses, as a resin composition to be used in welding with laser beam, a laser welding resin composition containing 100 parts by mass of a thermoplastic polyester resin (A), 5 to 150 parts by mass of a reinforcing filler (B), 0 to 20 parts by mass of an impact modifier (C), 0 to 5 parts by mass of an epoxy compound (D), 0 to 10 parts by mass of a flow modifier (E), and 0.001 to 0.2 parts by mass of at least one laser absorptive dye (F) selected from nigrosine, aniline black, phthalocyanine, naphthalocyanine, porphyrin, perylene, quaterrylene an azo dye, anthraquinone, a squaric acid derivative and immonium.

A polybutylene terephthalate-based resin is excellent in heat resistance, a mechanical strength, dimensional stability, electric properties, oil resistance, solvent resistance, surface gloss, colorability and flame retardance, and in addition, it has a high crystallization rate, and is good in flowability and moldability. Then, the polybutylene terephthalate-based resin is a resin widely used in the fields of, for example, the electric/electronic field and the vehicle field.

The polybutylene terephthalate-based resin has, however, a comparatively low laser transmitting property as compared with a polycarbonate resin, a polystyrene-based resin or the like, and in addition, is easily warped. Therefore, a problem with the polybutylene terephthalate-based resin is that a bond strength obtained by the laser welding tends to be inadequate.

Therefore, regarding a polybutylene terephthalate-based material used in the laser welding, for example, a method in which copolymerized polybutylene terephthalate is used (Patent Literature 3 (Japanese Patent No. 3510817)), a method in which a polycarbonate resin or a styrene-based resin is alloyed with polybutylene terephthalate (Patent Literature 4 (Japanese Patent Laid-Open No. 2003-292752) and Patent Literature 5 (Japanese Patent No. 4641377)) have been disclosed, for example.

Besides, as a resin composition excellent in moldability and having extremely excellent laser weldability obtained by using, as a polybutylene terephthalate resin, a resin composition containing a specific additional resin, a specific laser absorptive dye, and if necessary, a reinforcing filler, an epoxy compound, a flow modifier and others, Patent Literature 6 (Japanese Patent Laid-Open No. 2013-155278) discloses a resin composition for use in welding with laser beam, containing (A) 50 to 95 parts by mass of a polybutylene terephthalate-based resin and (B) 50 to 5 parts by mass of at least one resin selected from the following resins (B-1) to (B-5) with respect to 100 parts by mass of a total amount of the resins (A) and (B), and further containing, with respect to 100 parts by mass of the total amount of the resins (A) and (B), (D) 0 to 120 parts by mass of a reinforcing filler, (E) 0 to 5 parts by mass of an epoxy compound, (F) 0 to 10 parts by mass of a flow modifier, and 0.001 to 0.2 parts by mass of at least one laser absorptive dye selected from nigrosine, aniline black, phthalocyanine, naphthalocyanine, porphyrin, perylene, quaterrylene, an azo dye, anthraquinone, a squaric acid derivative and immonium:

(B-1) a polyethylene terephthalate-base resin;
(B-2) a polycarbonate-based resin;
(B-3) an aromatic vinyl-based resin;
(B-4) an acrylic-based resin; and
(B-5) a polyamide-based resin.

CITATION LIST

Patent Literature

Patent Literature 1: Japanese Patent Laid-Open No. 2007-112127
Patent Literature 2: Japanese Patent Laid-Open No. 2013-155277
Patent Literature 3: Japanese Patent No. 3510817
Patent Literature 4: Japanese Patent Laid-Open No. 2003-292752
Patent Literature 5: Japanese Patent No. 4641377
Patent Literature 6: Japanese Patent Laid-Open No. 2013-155278

SUMMARY OF INVENTION

Technical Problem

In a laser welded body obtained by integrating, through laser welding, a laser transmissive/absorptive molding member containing a colorant containing nigrosine alone and a laser absorptive molding member containing a colorant containing nigrosine and/or carbon black as described in Patent Literature 1, a molten pool is formed through the laser transmissive/absorptive molding member in the thickness direction to reach the laser absorptive molding member. Therefore, even when there is a gap between the laser transmissive/absorptive molding member and the laser absorptive molding member, the gap is filled with a molten resin, and thus, the members can be comparatively firmly welded to each other.

When the laser transmissive/absorptive molding member and the laser absorptive molding member are both polybutylene terephthalate homopolymers, however, these are easily warped, and hence a welding strength is varied by a gap caused by warpage. Therefore, even in the laser welded body having the aforementioned structure, it is difficult to obtain an increased welding strength, which is problematic.

Accordingly, regarding a laser welded body obtained when both the members are made of polybutylene terephthalate-based materials, namely, obtained by integrating, through the laser welding, a laser transmissive/absorptive molding member of a polybutylene terephthalate-based material and a laser absorptive molding member of a polybutylene terephthalate-based material, the present invention aims at providing a novel laser welded body having a further improved bond strength.

Solution to Problem

The present invention proposes a laser welded body having a structure
in which a member I and a member II are integrally bonded to each other, in which the member I contains a polyester-based resin A, and 0.0005 to 5.0 parts by mass, with respect to 100 parts by mass of the polyester-based resin A, of a coloring material capable of transmitting and absorbing laser beam (referred to as the "laser transmissive/absorptive coloring material"), and the polyester-based resin A contains at least a polybutylene terephthalate copolymer resin,
the member II contains a polyester-based resin B, and 0.15 to 10.00 parts by mass, with respect to 100 parts by mass of the polyester-based resin B, of a coloring material not transmitting but capable of absorbing laser beam (referred to as the "laser absorptive coloring material"), and the polyester-based resin B contains any one of the following resins (B1), (B2) and (B3):

(B1) a polybutylene terephthalate homopolymer;

(B2) a resin containing a polybutylene terephthalate homopolymer (B2-1) and at least one resin selected from the group consisting of a polyethylene terephthalate resin, a polycarbonate resin and an aromatic vinyl-based resin (B2-2); and (B3) a resin containing a polybutylene terephthalate copolymer resin (B3-1) and at least one resin selected from the group consisting of a polyethylene terephthalate resin, a polycarbonate resin and an aromatic vinyl-based resin (B3-2).

Advantageous Effects of Invention

In a laser welded body proposed by the present invention, a member I contains a laser transmissive/absorptive coloring material capable of transmitting and absorbing laser beam, and at the time of laser welding, generates heat while absorbing and transmitting laser beam. Therefore, a resin containing a polybutylene terephthalate copolymer resin is selected as a base resin of the member I, which is capable of attaining a transmittance of the member I of 5 to 90%. Since the member I contains the polybutylene terephthalate copolymer resin, a degree of crystallinity is low and a molded article is less warped. Hence, a gap caused between the members I and II is reduced to increase a welding strength. On the other hand, the member II contains a laser absorptive coloring material not transmitting but capable of absorbing laser beam, and at the time of the laser welding, absorbs laser beam to generate heat and melt, to thereby achieving efficient transmittance of the heat to the member I. In addition, the member II preferably causes small warpage to reduce a gap between the member I and the member II. Accordingly, as a polyester-based resin B corresponding to a base resin of the member II, any one of the polybutylene terephthalate-based resins (B1), (B2) and (B3) described above is selected. Due to such respective material compositions of the members I and II taking their combination into consideration, warpage is smaller. As a result, a gap formed between the members I and II can be reduced, and hence a bond strength can be further increased.

DESCRIPTION OF EMBODIMENT

Figure 1:
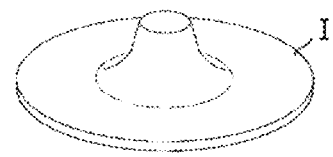
FIG. 1 is a diagram of a member I produced in examples.
Figure 1:

The present invention will now be described based on an embodiment. It is noted that the present invention is not limited to the following embodiment.

[Present Laser Welded Body]

A laser welded body according to an example of the embodiment of the present invention (hereinafter referred to as the "present laser welded body") is a laser welded body having a structure in which members I and II, that is, two members made of polybutylene terephthalate-based materials, are integrally bonded to each other by laser welding.

The present laser welded body can optionally have another structure as long as it has this structure.

A polybutylene terephthalate-based material refers to a material containing polybutylene terephthalate or a polybutylene terephthalate copolymer in an amount of 50% by mass or more of resin components contained in the material.

<<Member I>>

The member I may be a member molded from a resin composition containing a polyester-based resin A and a laser transmissive/absorptive coloring material that can transmit and absorb laser beam.

The member I can appropriately contain, in addition to the polyester-based resin A and the laser transmissive/absorptive coloring material, an additional component as described later.

<Polyester-Based Resin A>

The polyester-based resin A is preferably a resin at least containing a polybutylene terephthalate copolymer resin (hereinafter sometimes referred to as the "copolymerized PBT").

In particular, the polyester-based resin A is preferably a polybutylene terephthalate copolymer resin, or a resin containing a polybutylene terephthalate copolymer resin and a polybutylene terephthalate homopolymer (hereinafter sometimes referred to as the "homo PBT").

(Copolymerized PBT)

The polybutylene terephthalate copolymer resin (hereinafter sometimes referred to as the "copolymerized PBT") is a polybutylene terephthalate copolymer containing another copolymer component excluding a terephthalic acid unit and a 1,4-butanediol unit.

Examples of a dicarboxylic acid unit excluding terephthalic acid include aromatic dicarboxylic acids such as isophthalic acid, orthophthalic acid, 1,5-naphthalenedicarboxylic acid, 2,5-naphthalenedicarboxylic acid, 2,6-naphthalenedicarboxylic acid, biphenyl-2,2'-dicarboxylic acid, biphenyl-3,3'-dicarboxylic acid, biphenyl-4,4'-dicarboxylic acid, bis(4,4'-carboxyphenyl)methane, anthracenedicarboxylic acid and 4,4'-diphenyl ether dicarboxylic acid, alicyclic dicarboxylic acids such as 1,4-cyclohexane dicarboxylic acid and 4,4'-dicyclohexyl dicarboxylic acid, and aliphatic dicarboxylic acids such as adipic acid, sebacic acid, azelaic acid and dimer acid.

Examples of a diol unit excluding 1,4-butanediol include aliphatic or alicyclic diols having 2 to 20 carbon atoms, and bisphenol derivatives. Specific examples include ethylene glycol, propylene glycol, 1,5-pentanediol, 1,6-hexanediol, neopentyl glycol, decamethylene glycol, cyclohexane dimethanol, 4,4-dicyclohexyl hydroxymethane, 4,4'-dicyclohexyl hydroxypropane and an ethylene oxide-added diol of bisphenol A.

In view of mechanical properties and heat resistance, a ratio of terephthalic acid in the dicarboxylic acid unit in the copolymerized PBT is preferably 70% by mole or more, more preferably 90% by mole or more, and particularly preferably 95% by mole or more.

Besides, a ratio of 1,4-butanediol in the diol unit is preferably 70% by mole or more, and more preferably 90% by mole or more.

In addition to the aforementioned bifunctional monomers, a small amount of a polyfunctional monomer can be used for the copolymerized PBT, including an acid having trifunctional ester-forming ability such as tricarballylic acid, trimesic acid or trimellitic acid, or tetrafunctional ester-forming ability such as pyromellitic acid, or an alcohol having trifunctional or tetrafunctional ester-forming ability such as glycerin, trimethylolpropane or pentaerythritol for introducing a branch structure, or a monofunctional compound such as a fatty acid for adjusting a molecular weight.

In particular, with regard to the copolymer component, the copolymerized PBT is preferably a polybutylene terephthalate resin in which polyalkylene glycol (particularly, polytetramethylene glycol (PTMG)) is copolymerized, or a dimer acid-copolymerized polybutylene terephthalate resin, and particularly preferably an isophthalic acid-copolymerized polybutylene terephthalate resin.

In the copolymerized PBT in which polytetramethylene glycol (PTMG) is copolymerized, a ratio of a tetramethylene glycol component in the copolymer is preferably 3 to 40% by mass, more preferably 5% by mass or more or 30% by mass or less, and further preferably 10% by mass or more or 25% by mass or less. Such a copolymerization ratio is preferably employed because the laser weldability and the heat resistance tend to be excellently balanced.

On the other hand, in the copolymerized PBT in which dimer acid is copolymerized, a ratio of a dimer acid component in all the carboxylic acid components is, in terms of a carboxylic acid group, preferably 0.5 to 30% by mole, more preferably 1% by mole or more or 20% by mole or less, and further preferably 3% by mole or more or 15% by mole or less. Such a copolymerization ratio is preferably employed because the laser weldability, long-term heat resistance and toughness tend to be excellently balanced.

Furthermore, in the copolymerized PBT in which isophthalic acid is copolymerized, a ratio of an isophthalic acid component in all the carboxylic acid components is, in terms of a carboxylic acid group, preferably 1 to 30% by mole, more preferably 2% by mole or more or 20% by mole or less, and further preferably 3% by mole or more or 15% by mole or less. Such a copolymerization ratio is preferably employed because the laser weldability, the heat resistance, injection moldability and toughness tend to be excellently balanced.

In view of the laser weldability and moldability, the copolymerized PBT is particularly preferably a copolymerized PBT in which polytetramethylene glycol is copolymerized or a copolymerized PBT in which isophthalic acid is copolymerized.

The copolymerized PBT has an intrinsic viscosity of preferably 0.5 to 2.0 dl/g.

When the intrinsic viscosity is 0.5 dl/g or more, the mechanical strength of the welded body does not become too low. When it is 2.0 dl/g or less, the flowability can be prevented from lowering, and hence the moldability and the laser weldability can be prevented from deteriorating.

From these points of view, the intrinsic viscosity of the copolymerized PBT is preferably 0.5 to 2.0 dl/g, more preferably 0.6 dl/g or more or 1.5 dl/g or less, and further preferably 0.7 dl/g or more or 1.2 dl/g or less.

The intrinsic viscosity is a value measured at 30° C. in a mixed solvent containing tetrachloroethane and phenol at 1:1 (mass ratio).

The copolymerized PBT has an amount of terminal carboxyl group of preferably 60 eq/ton or less.

When the amount of terminal carboxyl group is 60 eq/ton or less, gas generation can be restrained at the time of melt molding the resin composition.

From this point of view, the amount of terminal carboxyl group of the copolymerized PBT is preferably 60 eq/ton or less, more preferably 50 eq/ton or less, and further preferably 30 eq/ton or less.

On the other hand, a lower limit of the amount of terminal carboxyl group is not especially specified. The lower limit is usually 5 eq/ton or more.

The amount of terminal carboxyl group of the copolymerized PBT can be obtained by dissolving 0.5 g of the resin in 25 mL of benzyl alcohol, and titrating the resultant using a 0.01 mol/l benzyl alcohol solution of sodium hydroxide.

The amount of terminal carboxyl group can be adjusted by any of conventionally known methods such as a method in which polymerization conditions such as the ratio of raw materials used at the time of polymerization, a polymerization temperature and a pressure reducing method are tailored, and a method in which a terminal blocking agent is reacted.

(Homo PBT)

The homo PBT is a macromolecule having a structure in which a terephthalic acid unit and a 1,4-butanediol unit are ester-linked, and is a polymer containing a terephthalic acid unit and a 1,4-butanediol unit.

The homo PBT has an amount of terminal carboxyl group of preferably 60 eq/ton or less, more preferably 50 eq/ton or less, and further preferably 30 eq/ton or less.

The amount of terminal carboxyl group of a polybutylene terephthalate homopolymer can be obtained by dissolving 0.5 g of the resin in 25 mL of benzyl alcohol, and titrating the resultant using a 0.01 mol/l benzyl alcohol solution of sodium hydroxide.

The amount of terminal carboxyl group can be adjusted by any of conventionally known methods such as a method in which polymerization conditions such as the ratio of raw materials used at the time of polymerization, a polymerization temperature and a pressure reducing method are tailored, and a method in which a terminal blocking agent is reacted.

The homo PBT has an intrinsic viscosity of preferably 0.5 to 2.0 dl/g.

When the intrinsic viscosity is 0.5 dl/g or more, the mechanical strength of the welded body does not become too low. When it is 2.0 dl/g or less, the flowability can be prevented from lowering, and hence the moldability and the laser weldability can be prevented from deteriorating.

From these points of view, the intrinsic viscosity of the homo PBT is preferably 0.5 to 2 dl/g, more preferably 0.6 dl/g or more or 1.5 dl/g or less, and further preferably 0.7 dl/g or more or 1.2 dl/g or less.

The intrinsic viscosity is a value measured at 30° C. in a mixed solvent containing tetrachloroethane and phenol at 1:1 (mass ratio).

(Homo PBT+Copolymerized PBT)

When a resin containing the copolymerized PBT and the homo PBT is selected as the polyester-based resin A, the content of the copolymerized PBT is preferably 5 to 95% by mass with respect to total 100% by mass of the copolymerized PBT and the homo PBT.

The content of the copolymerized PBT is preferably 5% by mass or more because a resultant molded product is less warped to lead to a small gap between the members I and II caused at the time of welding, resulting in increasing the welding strength. Besides, the copolymer PBT has a lower melting point and a lower melting enthalpy than the homo PBT, and hence easily melts with a smaller amount of thermal energy of laser beam, and therefore, a laser scanning speed can be set high, resulting in excellent productivity.

The content is preferably 95% by mass or less because excellent moldability can be obtained.

From these points of view, the content of the copolymerized PBT is, with respect to total 100% by mass of the copolymerized PBT and the homo PBT, preferably 5 to 95% by mass, more preferably 10% by mass or more or 90% by mass or less, and further preferably 20% by mass or more or 80% by mass or less.

(Resin for Polyester Resin A)

The polyester resin A for the member I may contain, in addition to the copolymerized PBT and the homo PBT, an "additional resin" as long as the effects of the present invention are not impaired. The copolymerized PBT is, however, preferably a principal component resin of the polyester resin A for the member I, and a resin containing the copolymerized PBT and/or the copolymerized PBT and the homo PBT preferably accounts for 50% by mass or more, more preferably 60% by mass or more, and further preferably 70% by mass or more of resins for the member I.

When the polyester resin A for the member I contains the "additional resin" in addition to the copolymerized PBT and the homo PBT, the polyester resin A needs to have a different composition from the polyester-based resin B for the member II described later. The different composition has a meaning encompassing a case where different types of resins are contained, a case where the same types of resins are contained in a different mixing ratio, and a case where copolymerization components of resins and their copolymerization ratios are different.

Examples of the "additional resin" that can be contained in the polyester resin A include a polyethylene terephthalate resin, a polycarbonate resin and an aromatic vinyl-based resin.

<Laser Transmissive/Absorptive Coloring Material>

Examples of the laser transmissive/absorptive coloring material contained in the member I include various organic dyes/pigments including azine-based, such as nigrosine or aniline black, phthalocyanine-based, naphthalocyanine-based, porphyrin-based, quaterrylene-based, azo-based, azomethine-based, anthraquinone-based, squaric acid derivative and immonium, quinacridone-based, dioxazine-based, diketo pyrrolo pyrrole-based, anthrapyridone-based, isoindolinone-based, indanthrone-based, perinone-based, perylene-based, indigo-based, thioindigo-based, quinophthalone-based, quinoline-based, and triphenylmethane-based dyes/pigments. One of these can be selected to be used singly, or two or more of these can be used in combination.

The term "dye/pigment" herein means a dye or a pigment.

Among those described above, in order to increase blackness, the laser transmissive/absorptive coloring material contained in the member I is preferably a combination of (X) a dye/pigment principally absorbing at a laser beam wavelength and (Y) a dye/pigment principally transmitting laser beam.

The dye/pigment (X) principally absorbing at the laser beam wavelength preferably contains a condensation mixture of azine-based compounds each having an azine skeleton.

The condensation mixture of azine-based compounds each having an azine skeleton is preferably nigrosine.

Nigrosine works as a dye/pigment having laser absorbing property, and has gentle absorption in a range of laser beam of 800 nm to 1200 nm.

Nigrosine is a black azine-based condensation mixture listed in Color Index as C.I. Solvent Black 5 or C.I. Solvent Black 7.

Nigrosine can be synthesized by, for example, oxidation and dehydration condensation of aniline, aniline hydrochloride and nitrobenzene in the presence of iron chloride at a reaction temperature of 160 to 190° C. An example of a commercially available product of nigrosine includes "NUBIAN® BLACK series" (trade name, manufactured by Orient Chemical Industries Co., Ltd.).

On the other hand, examples of the dye/pigment (Y) principally transmitting laser beam include anthraquinone-based dyes/pigments, perinone-based dyes/pigments and azomethine-based dyes/pigments.

A color to be provided by such a dye/pigment depends upon an absorption wavelength of light, and for increasing blackness, specifically, any of the following combinations of dyes/pigments is employed: a combination of a dye/pigment providing a blue color (hereinafter sometimes referred to as a blue dye), a dye/pigment providing a yellow color (hereinafter sometimes referred to as a yellow dye) and a dye/pigment providing a red color (hereinafter sometimes referred to as a red dye); a combination of a dye/pigment providing a violet color (hereinafter sometimes referred to as a violet dye) and a yellow dye; and a combination of a dye/pigment providing a green color (hereinafter sometimes referred to as a green dye), a red dye, a blue dye and a dye/pigment providing a brown color (hereinafter sometimes referred to as a brown dye).

A preferable blue dye is an anthraquinone dye/pigment having a maximum absorption wavelength in a range of 590 to 635 nm. An anthraquinone dye/pigment is an oil-soluble dye/pigment usually having a blue color.

When this dye/pigment is used for a combination as the laser transmissive/absorptive coloring material contained in the member I, a colorant that has higher visibility and provides black color having high coloring power can be obtained by combining a red dye and a yellow dye in combination therewith through subtractive color mixture when used in a combination for a black mixed dye/pigment, as compared with, for example, a green anthraquinone dye/pigment.

As the anthraquinone dye/pigment having a maximum absorption wavelength in a range of 590 to 635 nm, one having a value (of a decomposition starting temperature) measured with a thermogravimetric analyzer TG/DTA in the presence of air of 300° C. or more is preferably selected.

Examples of a preferable anthraquinone dye/pigment include C.I. Solvent Blue 97 (decomposition starting temperature: 320° C.) and C.I. Solvent Blue 104 (decomposition starting temperature: 320° C.) as described in COLOR INDEX. Single one of, or two or more of these may be used. When an amount mixed is large, however, the dye/pigment easily bleeds from a molded article under a high temperature environment, and heat discoloration resistance tends to deteriorate.

Examples of a commercially available anthraquinone dye/pigment include "NUBIAN® BLUE series" and "OPLAS® BLUE series" (both trade names, manufactured by Orient Chemical Industries Co., Ltd.).

As a preferable red dye, a perinone dye/pigment having good heat resistance is selected, and an example includes a red perinone dye/pigment having a maximum absorption wavelength in a range of 460 to 480 nm. Specific examples of such a perinone dye/pigment include C.I. Solvent Red 135, 162, 178 and 179. Single one of, or two or more of these may be used. When an amount mixed is large, however, the dye/pigment easily bleeds from a molded article under a high temperature environment, and heat discoloration resistance tends to deteriorate.

Examples of a commercially available product of a red perinone dye/pigment include "NUBIAN® RED series", "OPLAS® RED series" (both trade names, manufactured by Orient Chemical Industries Co., Ltd.).

As a preferable yellow dye, an anthraquinone dye/pigment having good heat resistance is selected, and an anthraquinone dye/pigment having a maximum absorption wavelength in a range of 435 to 455 nm is suitably used. An anthraquinone dye/pigment having a maximum absorption wavelength of 435 to 455 nm is usually a yellow oil-soluble dye/pigment.

Specific examples of the yellow anthraquinone dye/pigment include C.I. Solvent Yellow 163, and C.I. Vat Yellow 1, 2 and 3. Single one of, or two or more of these may be used. When an amount mixed is large, however, the dye/pigment easily bleeds from a molded article under a high temperature environment, and heat discoloration resistance tends to deteriorate. Examples of a commercially available product of a yellow anthraquinone dye/pigment include "NUBIAN® YELLOW series, OPLAS® YELLOW series" (both trade names, manufactured by Orient Chemical Industries Co., Ltd.).

As a preferable brown dye, an azomethine-based pigment is selected. Examples thereof include a dye/pigment containing at least a 1:1 type azomethine nickel complex represented by the following formula (1):

[Formula 1]

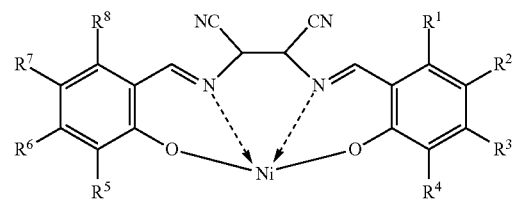

(1)

In the formula (1), $R^1$ to $R^8$ are the same as or different from one another, and are a hydrogen atom, an alkyl group having 1 to 18 carbon atoms, an alkoxy group having 1 to 18 carbon atoms, a carboxy group, a hydroxy group, an amino group, an alkylamino group, a nitro group or a halogen atom.

Preferable examples of the alkyl group having 1 to 18 carbon atoms used as $R^1$ to $R^8$ in the formula (1) include a methyl group, an ethyl group, an n-propyl group, an i-propyl group, an n-butyl group, an i-butyl group, a sec-butyl group, a t-butyl group, an n-pentyl group, a neo-pentyl group, an i-pentyl group, an n-hexyl group, an n-heptyl group, an n-octyl group, a 2-ethylhexyl group, and an n-decyl group. Preferable examples of the alkoxy group having 1 to 18 carbon atoms include a methoxy group, an ethoxy group, an n-propoxy group, an i-propoxy group, an n-butoxy group, an i-butoxy group, a sec-butoxy group, a t-butoxy group, an n-pentyloxy group, a neo-pentyloxy group, an n-hexyloxy group, an n-heptyloxy group and an n-octyloxy group. Preferable examples of the alkylamino group include a methylamino group, a dimethylamino group, an ethylamino group and a diethylamino group, and examples of a halogen atom include F, Cl and Br.

An azomethine pigment used in the 1:1 type azomethine nickel complex can be produced by a known method. The pigment can be obtained by, for example, reacting diaminomaleonitrile and salicylaldehyde optionally having a substituent as shown in the following reaction formula:

(2)

[Formula 2]

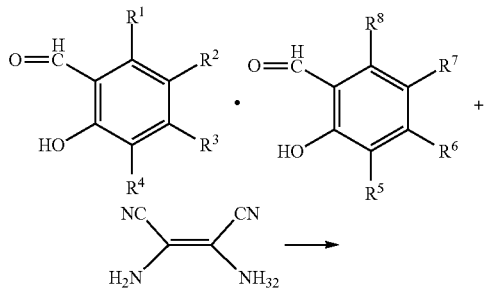

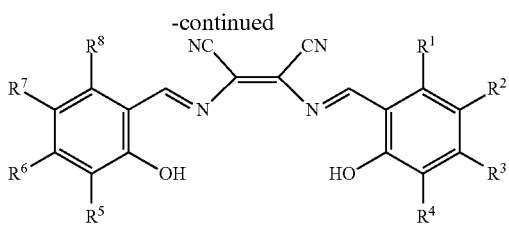

$R^1$ to $R^8$ in the formula (2) have the same definition as $R^1$ to $R^8$ in the formula (1).

When the azomethine pigment is metallized with a nickelizing agent such as nickel acetate, the 1:1 type azomethine nickel complex is obtained as follows:

[Formula 3]

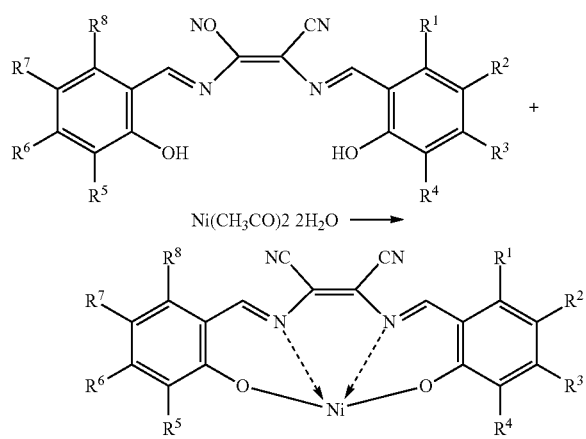

(3)

$R^1$ to $R^8$ in the formula (3) have the same definition as $R^1$ to $R^8$ in the formula (1).

In the thus obtained nickel complex, the azomethine pigment works as a chelating tetradentate ligand, and thus, a stable complex is formed.

Owing to good durability such as heat resistance and light resistance, the 1:1 type azomethine nickel complex is useful for a resin composition for an outdoor member or a member to be exposed to heat, and it is less changed by heat in melting in the laser welding, and therefore is suitably used as a colorant for a laser welded member.

Specific examples of the 1:1 type azomethine nickel complex shown in the formula (1) include compound examples 1 to 7 having the following $R^1$ to $R^9$ shown in Table 1 below.

The azomethine nickel complex used as the laser transmissive/absorptive coloring material contained in the member I is not limited to these.

TABLE 1

| Compound Example No. | $R^1$ | $R^2$ | $R^3$ | $R^4$ | $R^5$ | $R^6$ | $R^7$ | $R^8$ |
|---|---|---|---|---|---|---|---|---|
| Compound Example 1 | H | H | H | H | H | H | H | H |
| Compound Example 2 | H | OCH$_3$ | H | H | H | H | OCH$_3$ | H |
| Compound Example 3 | H | Br | H | H | H | H | Br | H |
| Compound Example 4 | H | H | OCH$_3$ | H | H | OCH$_3$ | H | H |
| Compound Example 5 | H | C$_2$H$_5$ | H | H | H | H | C$_2$H$_5$ | H |
| Compound Example 6 | H | Cl | H | H | H | H | Cl | H |
| Compound Example 7 | H | H | CH$_3$ | H | H | CH$_3$ | H | H |

As the dye/pigment (Y) principally transmitting laser beam used as the laser transmissive/absorptive coloring material contained in the member I, (C1) an anthraquinone dye/pigment having a maximum absorption wavelength in a range of 590 to 635 mm, (C2) a perinone dye/pigment having a maximum absorption wavelength in a range of 460 to 480 nm, and (C3) an anthraquinone dye/pigment having a maximum absorption wavelength in a range of 435 to 455 nm are preferably used.

Depending on compatibility with the thermoplastic polyester resin A, the hue of nigrosine corresponding to the dye/pigment (X) principally absorbing at a laser beam wavelength and oil-soluble dye(s)/pigment(s) constituting the dye/pigment (Y) principally transmitting laser beam is changed, and therefore, it is necessary to adjust a ratio of the oil-soluble dye(s)/pigment(s) constituting the dye/pigment (Y) for obtaining a molded plate having a jet-black color suitable as a black hue. Therefore, the ratio between C1, C2 and C3 is preferably C1:C2:C3=24 to 42:24 to 48:22 to 46 in terms of a mass ratio (provided that the sum of C1, C2 and C3 is 100 parts by mass). The ratio of C1:C2:C3 is more preferably 24 to 41:24 to 39:22 to 46.

Besides, the dye/pigment (Y) principally transmitting laser beam used as the laser transmissive/absorptive coloring material contained in the member I is preferably a colorant containing the perinone dye/pigment C2 having a maximum absorption wavelength in a range of 460 to 480 nm and the anthraquinone dye/pigment C1 having a maximum absorption wavelength in a range of 590 to 635 nm in a mass ratio C2/C1 of 0.4 to 2. In consideration of a color developing property obtained by the resin composition of the present invention and bleed-out prevention, the ratio is more preferably 0.4 to 1.5, and further preferably 0.6 or more or 1.5 or less.

Examples of another dye/pigment usable together include an azo dye, a quinacridone dye, a dioxazine dye, a quinophthalone dye, a perylene dye, a perinone dye (a compound having a different wavelength from the dye/pigment C2 described above), an isoindolinone dye, a triphenylmethane dye, an anthraquinone dye (a compound having a different wavelength from the dyes/pigments C1 and C3 described above) and an azomethine dye. Nickel is preferably not contained.

The content of the laser transmissive/absorptive coloring material is preferably 0.0005 to 5.0 parts by mass with respect to 100 parts by mass of the polyester-based resin A. The content of the transmissive/absorptive coloring material is preferably 0.0005 parts by mass or more because the resin absorbs laser beam to melt. On the other hand, the content is preferably 5.0 parts by mass or less because thus, the bleed-out of the dye/pigment can be prevented while an amount of heat generation can be controlled.

From these points of view, the content of the laser transmissive/absorptive coloring material is, with respect to the polyester-based resin A, preferably 0.0005 to 5.0 parts by mass, more preferably 0.001 parts by mass or more or 4.0 parts by mass or less, and further preferably 0.005 parts by mass or more or 3.0 parts by mass or less.

When the combination of the dye/pigment (X) principally absorbing at a laser beam wavelength and the dye/pigment (Y) principally transmitting laser beam is used as the laser transmissive/absorptive coloring material as described above, a content of the dye/pigment (X) is preferably 0.0005 to 0.6 parts by mass with respect to 100 parts by mass of the polyester-based resin A.

The content of the dye/pigment (X) principally absorbing laser beam is preferably 0.0005 parts by mass or more because thus, the absorbing dye/pigment homogeneously disperses to allow the resin to absorb laser beam to uniformly melt. On the other hand, the content is preferably 0.6 parts by mass or less because thus, laser beam is transmitted to minimally form foams through decomposition of the resin.

From these points of view, the content of the dye/pigment (X) absorbing laser beam is, with respect to 100 parts by mass of the polyester-based resin A, preferably 0.0005 to 0.6 parts by mass, more preferably 0.001 parts by mass or more or 0.3 parts by mass or less, and further preferably 0.003 parts by mass or more or 0.1 parts by mass or less.

A content of the dye/pigment (Y) is preferably 0.0005 to 5 parts by mass with respect to 100 parts by mass of the polyester-based resin A.

The content of the dye/pigment (Y) principally transmitting laser beam is preferably 5.0 parts by mass or less because thus, the bleed-out of the dye/pigment is difficult to occur.

From this point of view, the content of the dye/pigment (Y) principally transmitting laser beam is, with respect to 100 parts by mass of the polyester-based resin A, preferably 0.0005 to 5 parts by mass, more preferably 0.05 parts by mass or more or 4 parts by mass or less, and further preferably 0.1 parts by mass or more or 3 parts by mass or less.

A ratio of the content of the dye/pigment (Y) to the content of the dye/pigment (X), Y/X, is preferably 1 to 100, more preferably 10 or more or 90 or less, and further preferably 20 or more or 80 or less.

<Additional Components>

The member I can contain various additives if necessary. Examples of such additives include a reinforcing filler, an impact modifier, a flow modifier, an auxiliary colorant, a dispersant, a stabilizer, a plasticizer, an ultraviolet absorber, a light stabilizer, an antioxidant, an antistatic agent, a lubricant, a release agent, a crystallization accelerator, a crystal nucleating agent, a flame retardant and an epoxy compound.

<Shape of Member I>

A shape of the member I is arbitrary. It may be, for example, in a plate shape, a rectangular shape or another complicated shape. It may be an odd-shaped extruded product (such as a bar or a pipe) to be welded with an end abutted, or may be a metal-inserted molded product used in a current-carrying component, an electronic component or the like requiring high waterproofness and airtightness.

A method for molding the member I is also arbitrary. Examples include an injection molding method, a high-speed injection molding method, an injection compression molding method, a two-color molding method, a blow molding method by a gas assist method or the like, a molding method using an insulation mold, a molding method using a rapid heating mold, expansion molding (also including a supercritical fluid), insert molding, an IMC (in-mold coating molding) molding method, an extrusion molding method, a sheet molding method, a thermoforming method, a rotational molding method, a laminate molding method, a press molding method and a blow molding method.

Since the laser beam needs to be transmitted through the whole thickness of the member I, it is not preferable that the member I have too large a thickness. On the other hand, too small a thickness is not preferred because the strength of the resultant molded product is deteriorated.

From these points of view, a thickness of a bonding portion of the member I to be laser welded is preferably 0.2 mm to 4.0 mm, more preferably 0.4 mm or more or 3.5 mm or less, and further preferably 0.5 mm or more or 3.0 mm or less.

A transmittance of the member I is not limited. As the transmittance of the member I is higher, however, laser beam is easily transmitted, and hence the bond strength of the resultant molded product tends to increase. Therefore, in a case of measurement using light of a wavelength of 940 nm, when the member I has a thickness of 1.5 mm or more, the transmittance of the member I is preferably 10 to 80%, more preferably 10% or more or 70% or less, further preferably 15% or more or 600 or less, and particularly preferably 20% or more or 50° or less.

Besides, a reflectance of the member I is not also limited. As the reflectance of the member I is lower, however, laser loss is smaller, and a larger amount of laser beam tends to enter the member I. Therefore, in a case of measurement using light of a wavelength of 940 nm, when the member I has a thickness of 1.5 mm or more, the reflectance of the member I is preferably 1 to 90%, more preferably 5% or more or 80% or less, further preferably 10% or more or 70% or less, and particularly preferably 10° or more or 60° or less.

<<Member II>>

The member II may be a member molded from a resin composition containing a polyester-based resin B and a laser absorptive coloring material that does not transmit but can absorb laser beam.

The member II can appropriately contain an additional component in addition to the polyester-based resin B and the laser absorptive coloring material as described later.

<Polyester-Based Resin B>

The polyester-based resin B preferably contains any one of the following resins (B1), (B2) and (B3).

When any one of the following resins (B1), (B2) and (B3) is contained as the polyester-based resin of the member II, warpage of the member II can be reduced, and hence a gap caused between the members I and II at the time of welding can be reduced, resulting in increasing a welding strength. Besides, a residual stress of the welded body can be reduced.

(B1) a polybutylene terephthalate homopolymer;
(B2) a homo PBT-based mixed resin containing a polybutylene terephthalate homopolymer; and
(B3) a copolymerized PBT-based mixed resin containing a polybutylene terephthalate copolymer resin.

<Polybutylene Terephthalate Homopolymer (B1)>

The polybutylene terephthalate homopolymer (homo PBT) is as described above for the polybutylene terephthalate homopolymer (homo PBT) to be usable in the polyester-based resin A.

<Homo PBT-Based Mixed Resin (B2)>

The homo PBT-based mixed resin (B2) is preferably a resin containing a homo PBT (B2-1) and at least one resin selected from the group consisting of a polyethylene terephthalate resin, a polycarbonate resin and an aromatic vinyl-based resin (B2-2).

(Polybutylene Terephthalate Homopolymer (B2-1))

The polybutylene terephthalate homopolymer (B2-1) is as described above for the polybutylene terephthalate homopolymer (homo PBT) used in the polyester-based resin A.

(Polyethylene Terephthalate Resin (B2-2))

The polyethylene terephthalate resin (hereinafter sometimes referred to as "PET") is a resin containing an oxyethylene oxyterephthaloyl unit of terephthalic acid and ethylene glycol as a principal constituent unit among all constituent repeating units.

It may contain another repeating unit in addition to the oxyethylene oxyterephthaloyl unit.

PET is produced by using terephthalic acid or a lower alkyl ester thereof and ethylene glycol as principal raw materials. Another acid component and/or another glycol component may be used together as a raw material.

Examples of an acid component excluding terephthalic acid include phthalic acid, isophthalic acid, naphthalenedicarboxylic acid, 4,4'-diphenyl sulfone dicarboxylic acid, 4,4'-biphenyl dicarboxylic acid, 1,4-cyclohexane dicarboxylic acid, 1,3-phenylenedioxydiacetic acid and structural isomers of these, dicarboxylic acids such as malonic acid, succinic acid, adipic acid, and derivatives thereof, oxy acids such as p-hydroxybenzoic acid, glycolic acid, and derivatives thereof.

Besides, examples of a diol component excluding ethylene glycol include aliphatic glycols such as 1,2-propanediol, 1,3-propanediol, 1,4-butanediol, pentamethylene glycol, hexamethylene glycol and neopentyl glycol, alicyclic glycols such as cyclohexanedimethanol, and aromatic dihydroxy compound derivatives such as bisphenol A and bisphenol S.

PET may be those obtained by copolymerizing with preferably 1.0% by mole or less, more preferably 0.5% by mole or less, and further preferably 0.3% by mole of a branch component, for example, an acid having trifunctional ester-forming ability such as tricarballylic acid, trimeric acid or trimellitic acid, or tetrafunctional ester-forming ability such as pyromellitic acid, or an alcohol having trifunctional or tetrafunctional este forming ability such as glycerin, trimethylolpropane or pentaerythritol.

PET has an intrinsic viscosity of preferably 0.3 to 1.5 dl/g, more preferably 0.4 dl/g or more or 1.2 dl/g or less, and further preferably 0.5 dl/g or more or 0.8 dl/g or less.

The intrinsic viscosity of a polyethylene terephthalate resin is a value measured at 30° C. in a mixed solvent of tetrachloroethane and phenol at 1:1 (mass ratio).

PET has an amount of terminal carboxyl group of preferably 3 to 60 eq/ton.

The amount of terminal carboxyl group is preferably 60 eq/ton or less because gas generation can be restrained at the time of melt molding the resin material to lead to a tendency that mechanical properties of the resultant laser welding member tends to be improved. On the contrary, the amount of terminal carboxyl group is preferably 3 eq/ton or more because heat resistance, heat stability during retention and hue of the laser welding member tend to be improved.

From these points of view, the amount of terminal carboxyl group of PET is preferably 3 to 60 eq/ton, more preferably 5 eq/ton or more or 50 eq/ton or less, and further preferably 8 eq/ton or more or 40 eq/ton or less.

The amount of terminal carboxyl group of the polyethylene terephthalate resin has a value obtained by dissolving 0.5 g of the polyethylene terephthalate resin in 25 mL of benzyl alcohol, and titrating the resultant using a 0.01 mol/l benzyl alcohol solution of sodium hydroxide.

The amount of terminal carboxyl group can be adjusted by an any one of conventionally known methods such as a method in which polymerization conditions such as the ratio of raw materials used at the time of polymerization, a polymerization temperature and a pressure reducing method are tailored, and a method in which a terminal blocking agent is reacted.

(Polycarbonate Resin (B2-2))

The polycarbonate resin (also referred to as "PC") is an optionally branched thermoplastic polymer or copolymer obtained by reacting a dihydroxy compound, or a dihydroxy compound and a small amount of a polyhydroxy compound, with phosgene or diester carbonate.

A method for producing PC is not especially limited, and one produced by a conventionally known phosgene method (interfacial polymerization method) or a melting method (transesterification method) can be used. A polycarbonate resin produced by a melt polymerization method is preferred in view of laser beam transmittance and laser weldability.

As the dihydroxy compound used as a raw material, an aromatic dihydroxy compound is preferred. Examples thereof include 2,2-bis(4-hydroxyphenyl)propane (namely, bisphenol A), tetramethyl bisphenol A, bis(4-hydroxyphenyl)-p-diisopropylbenzene, hydroquinone, resorcinol and 4,4-dihydroxydiphenyl, and bisphenol A is preferred. Alternatively, a compound obtained by bonding one or more tetraalkylphosphonium sulfonates to the aromatic dihydroxy compound can be used.

Among these, an aromatic polycarbonate resin induced from 2,2-bis(4-hydroxyphenyl)propane or an aromatic polycarbonate copolymer induced from 2,2-bis(4-hydroxyphenyl)propane and another aromatic dihydroxy compound is preferred as PC. It may be a copolymer such as a copolymer with a polymer or an oligomer having a siloxane structure. Furthermore, a mixture of two or more of the above-described polycarbonate resins may be used.

PC has a viscosity average molecular weight of preferably 5000 to 30000.

When PC having a viscosity average molecular weight of 5000 or more is used, the mechanical strength of the resultant welded body can be retained. When the viscosity average molecular weight is 30000 or less, the flowability can be prevented from lowering, and hence the moldability and the laser weldability can be prevented from deteriorating.

From these points of view, the viscosity average molecular weight of PC is preferably 5000 to 30000, more preferably 10000 or more or 28000 or less, and further preferably 14000 or more or 24000 or less.

The viscosity average molecular weight of PC is a viscosity average molecular weight [Mv] calculated based on a solution viscosity measured at a temperature of 25° C. with methylene chloride used as a solvent.

PC has a ratio between a mass average molecular weight Mw and a number average molecular weight Mn in terms of polystyrene measured through gel permeation chromatography (GPC), Mw/Mn, of preferably 2 to 5, and more preferably 2.5 or more or 4 or less. When the ratio Mw/Mn is excessively low, the flowability in a molten state tends to increase to deteriorate the moldability. On the other hand, when the ratio Mw/Mn is excessively high, the melt viscosity tends to increase to make molding difficult.

Besides, in view of heat stability, hydrolytic stability, a color tone and the like, PC has an amount of terminal hydroxyl group of preferably 100 ppm by mass or more, more preferably 120 ppm by mass or more, further preferably 150 ppm by mass or more, and most preferably 200 ppm by mass or more. The amount of terminal hydroxyl group is, however, usually 1500 ppm by mass or less, preferably 1300 ppm by mass or less, further preferably 1200 ppm by mass or less, and most preferably 1000 ppm by mass or less. When the amount of terminal hydroxyl group of the polycarbonate resin is excessively small, the laser transmittance tends to be easily lowered, and initial hue at the time of molding may be degraded in some cases. When the amount of terminal hydroxyl group is excessively large, the retention heat stability and moisture and heat resistance tend to be deteriorated.

(Aromatic Vinyl-Based Resin (B2-2))

The aromatic vinyl-based resin is a polymer containing an aromatic vinyl structure as a principal component, and examples of an aromatic vinyl compound include styrene, α-methyl styrene, para-methyl styrene, vinyl toluene and vinyl xylene.

A copolymer obtained by copolymerizing an aromatic vinyl compound with another monomer can be used as the aromatic vinyl-based resin. Representative examples include an acrylonitrile-styrene copolymer (AS resin) obtained by copolymerizing styrene and acrylonitrile, and a maleic anhydride-styrene copolymer (maleic anhydride-modified polystyrene resin) obtained by copolymerizing styrene and maleic anhydride.

Representative examples of the aromatic vinyl-based resin include polystyrene (PS), acrylonitrile-styrene (AS), methyl methacrylate-styrene (MS), and a styrene-maleic acid copolymer.

In the aromatic vinyl-based resin, a rubber component can be copolymerized. Examples of the rubber component include conjugated diene-based hydrocarbons such as butadiene, isoprene and 1,3-pentadiene. When a rubber component is copolymerized, the amount of the rubber component to be copolymerized is 1% by mass or more and less than 50% by mass in all segments of the aromatic vinyl-based resin. The amount of the rubber component is preferably 3 to 40% by mass, and more preferably 5 to 30% by mass.

Examples of a rubber component-copolymerized aromatic vinyl-based resin include rubber-modified polystyrene (HIPS), acrylonitrile-butadiene-styrene (ABS), an acrylonitrile-styrene-acrylic rubber copolymer, methyl methacrylate-butadiene-styrene (MBS), acrylonitrile-styrene-acrylic acid (ASA), a styrene-butadiene copolymer (SBS) and a hydride thereof (SEBS), and a styrene-isoprene copolymer (SIS) and a hydride thereof (SEPS).

Examples of another copolymerizable monomer include α,β-unsaturated carboxylic acids such as acrylic acid and methacrylic acid, α,β-unsaturated carboxylic acid esters such as methyl methacrylate, ethyl methacrylate, t-butyl methacrylate and cyclohexyl methacrylate, α,β-unsaturated dicarboxylic acid anhydrides such as maleic anhydride and itaconic anhydride, and imide compounds of α,β-unsaturated dicarboxylic acid such as N-phenylmaleimide, N-methylmaleimide and N-t-butylmaleimide.

The aromatic vinyl-based resin has a mass average molecular weight measured by GPC of preferably 50000 to 500000.

When the molecular weight is 50000 or more, bleed-out can be restrained, and deterioration of the welding strength otherwise caused by generation of a decomposition gas in molding can be restrained. On the other hand, when the molecular weight is 500000 or less, the flowability and the laser welding strength can be increased.

From these points of view, the aromatic vinyl-based resin has a mass average molecular weight measured by GPC of preferably 50000 to 500000, more preferably 100000 or more or 400000 or less, and further preferably 150000 or more or 300000 or less.

In a case where the aromatic vinyl-based resin is an acrylonitrile-styrene copolymer, a melt flow rate (MFR) measured at 220° C. and 98 N is preferably 0.1 to 50 g/10 min.

When the MFR is 0.1 g/10 min or more, good compatibility with the polybutylene terephthalate resin can be obtained, and an appearance failure such as delamination can be prevented from occurring at the time of injection molding. On the other hand, when the MFR is 50 g/10 min or less, deterioration of the impact resistance can be restrained.

From these points of view, the melt flow rate (MFR) of the aromatic vinyl-based resin is preferably 0.1 to 50 g/10 min, more preferably 0.5 g/10 min or more or 30 g/10 min or less, and further preferably 1 g/10 min or more or 20 g/10 min or less.

Alternatively, in a case where the aromatic vinyl-based resin is polystyrene, MFR measured at 200° C. and 48 N is preferably 1 to 50 g/10 min, more preferably 3 g/10 min or more or 35 g/10 min or less, and further preferably 5 g/10 min or more or 20 g/10 min or less.

In a case where the aromatic vinyl-based resin is butadiene rubber-containing polystyrene, MFR measured at 200° C. and 49 N is preferably 0.1 to 40 g/10 min, more preferably 0.5 g/10 min or more or 30 g/10 min or less, and further preferably 0.8 g/10 min or more or 20 g/10 min or less.

(Homo PBT+PET)

When the homo PBT-based mixed resin (B2) contains the homo PBT (B2-1) and PET (B2-2), the content of PET (B2-2) is preferably 5 to 50% by mass in total 100% by mass of the homo PBT (B2-1) and PET (B2-2).

The content of PET (B2-2) is preferably 5% by mass or more because the laser welding performance is increased, and the content is preferably 50% by mass or less because the moldability is improved.

From these points of view, in total 100% by mass of the homo PBT (B2-1) and PET (B2-2), the content of PET (B2-2) is preferably 5 to 50% by mass, more preferably 10% by mass or more or 45% by mass or less, and further preferably 15% by mass or more or 40% by mass or less.

(Homo PBT+PC)

When the homo PBT mixed resin (B2) contains the homo PBT (B2-1) and PC (B2-2), the content of PC (B2-2) is preferably 5 to 50% by mass in total 100% by mass of the homo PBT (B2-1) and PC (B2-2).

The content of PC (B2-2) is preferably 5% by mass or more because the laser welding performance is increased, and the content is preferably 50% by mass or less because the moldability is improved.

From these points of view, in total 100% by mass of the homo PBT (B2-1) and PC (B2-2), the content of PC (B2-2) is preferably 5 to 50% by mass, more preferably 10% by mass or more or 45% by mass or less, and further preferably 15% by mass or more or 40% by mass or less.

(Homo PBT+Aromatic Vinyl-based Resin)

When the homo PBT mixed resin (B2) contains the homo PBT (B2-1) and the aromatic vinyl-based resin (B2-2), the content of the aromatic vinyl-based resin (B2-2) is 5 to 50% by mass in total 100% by mass of the homo PBT (B2-1) and the aromatic vinyl-based resin (B2-2).

The content of the aromatic vinyl-based resin (B2-2) is preferably 5% by mass or more because the laser welding performance is increased, and when the content is preferably 50% by mass or less because the moldability is improved.

From these points of view, in total 100% by mass of the homo PBT (B2-1) and the aromatic vinyl-based resin (B2-2), the content of the aromatic vinyl-based resin (B2-2) is preferably 5 to 50% by mass, more preferably 10% by mass or more or 45% by mass or less, and further preferably 15% by mass or more or 40% by mass or less.

Preferable contents when using a combination of the homo PBT (B2-1) and one of PET, PC and the aromatic vinyl-based resin (B2-2) are described above. A plurality of resins may be, however, appropriately selected from those described above as the resins (B2-2) to be used, and in this case, the contents of the selected resins are preferably determined in such a manner that the homo PBT accounts for 50% by mass or more of the whole, and that the resins (B2-2) are used in respective ratios so as not to exceed 100° by mass in total.

For example, when the aromatic vinyl-based resin and PC are used together as the resins (B2-2), the contents are preferably determined such that the content of the homo PBT is 50% by mass or more, that of the aromatic vinyl-based resin is 5 to 50% by mass, that of PC is 5 to 50% by mass, so as to give a total content 100% by mass.

Also when a plurality of resins are used as resins (B3-2) in the resin (B3) described below, the same applies to combine the resins.

<Copolymerized PBT-based Mixed Resin Composition (B3)>

The copolymerized PBT-based mixed resin (B3) is preferably a resin composition containing a copolymerized PBT (B3-1), and at least one resin selected from the group consisting of PET, PC and an aromatic vinyl-based resin (B3-2).

For such a case, the copolymerized PBT (B3-1) used in the copolymerized PBT-based mixed resin (B3) is as described above for the copolymerized PBT used in the polyester-based resin A.

Besides, PET, PC and the aromatic vinyl-based resin used in the copolymerized PBT-based mixed resin (B3) are as described above for PET, PC and the aromatic vinyl-based resin used in the homo PBT-based mixed resin (B2).

(Copolymerized PBT+PET)

When the copolymerized PBT-based mixed resin (B3) contains the copolymerized PBT (B3-1) and PET (B3-2), the content of PET (B3-2) is preferably 50% by mass or less in total 100% by mass of the copolymerized PBT (B3-1) and PET (B3-2).

The content of PET (B3-2) is preferably 50% by mass or less because excellent moldability can be obtained.

From this point of view, in total 100% by mass of the copolymerized PBT (B3-1) and PET (B3-2), the content of PET (B3-2) is preferably 50% by mass or less, more preferably 5% by mass or more or 40% by mass or less, and further preferably 5% by mass or more or 30% by mass or less.

(Copolymerized PBT+PC)

When the copolymerized PBT-based mixed resin (B3) contains the copolymerized PBT (B3-1) and PC (B3-2), the content of PC (B3-2) is preferably 50% by mass or less in total 100% by mass of the copolymerized PBT (B3-1) and PC (B3-2).

The content of PC (B3-2) is preferably 50% by mass or less because excellent moldability can be obtained.

From this point of view, in total 100% by mass of the copolymerized PBT (B3-1) and PC (B3-2), the content of PC (B3-2) is preferably 50% by mass or less, more preferably 5% by mass or more or 40% by mass or less, and further preferably 5% by mass or more or 30% by mass or less.

(Copolymerized PBT+Aromatic Vinyl-Based Resin)

When the copolymerized PBT-based mixed resin (B3) contains the copolymerized PBT (B3-1) and the aromatic vinyl-based resin (B3-2), the content of the aromatic vinyl-based resin (B3-2) is preferably 50% by mass or less in total 100% by mass of the copolymerized. PBT (B3-1) and, the aromatic vinyl-based resin (B3-2).

The content of the aromatic vinyl-based resin (B3-2) is preferably 50% by mass or less because excellent moldability can be obtained.

From this point of view, in total 100% by mass of the copolymerized PBT (B3-1) and the aromatic vinyl-based resin (B3-2), the content of the aromatic vinyl-based resin (B3-2) is preferably 50% by mass or less, more preferably 5% by mass or more or 45% by mass or less, and further preferably 5% by mass or more or 40% by mass or less.

<Resin for Polyester-Based Resin B>

The polyester resin B for the member II may contain, in addition to the resin (B1), (B2) or (B3) described above, an "additional resin" as long as the effects of the present invention are not impaired. It is, however, preferable that the resin (B1), (B2) or (B3) be a principal component resin of the polyester resin B for the member II, and the resin (B1), (B2) or (B3) accounts for preferably 50% by mass or more, more preferably 60% by mass or more, and further preferably 70% by mass or more of the resins for the member II.

When the polyester resin B for the member II contains the "additional resin", the polyester resin B needs to have a different composition from the above-described polyester-based resin A for the member I. The different composition has a meaning encompassing a case where different types of resins are contained, a case where the same types of resins are contained in a different mixing ratio, and a case where copolymerization components of resins and their copolymerization ratios are different.

Examples of the "additional resin" that can be contained in the polyester resin B include homo PBT, copolymerized PBT, a polyethylene terephthalate resin, a polycarbonate resin and an aromatic vinyl-based resin.

<Laser Absorptive Coloring Material>

Examples of the laser absorptive coloring material contained in the member II include a black colorant such as carbon black, and a white colorant such as titanium oxide or zinc sulfide, and at least one of or a combination of two or more of these can be used. Particularly, one containing carbon black is preferred.

As carbon black, for example, at least one of or a combination of two or more of furnace black, thermal black, channel black, lamp black and acetylene black can be used.

Carbon black precedently prepared as a masterbatch is preferably used to ease dispersion.

In view of dispersibility, a primary particle size of the carbon black is preferably 10 nm to 30 nm, and more preferably 15 nm or more or 25 nm or less. When dispersibility is good, welding unevenness caused in the laser welding is reduced.

Besides, in view of jet-blackness, the carbon black has a nitrogen adsorption specific surface area measured according to JIS K6217 of preferably 30 to 400 $m^2/g$, more preferably 50 $m^2/g$ or more, and further preferably 80 $m^2/g$ or more.

Besides, in view of the dispersibility, the carbon black has a DBP absorption measured according to JIS K6221 of preferably 20 to 200 cm$^3$/100 g, more preferably 40 cm$^3$/100 g or more or 170 cm$^3$/100 g or less, and further preferably 50 cm$^3$/100 g or more or 150 cm$^3$/100 g or less. When the dispersibility is good, the welding unevenness caused in the laser welding is reduced.

The content of the laser absorptive coloring material is preferably 0.15 to 10.00 parts by mass with respect to 100 parts by mass of the polyester-based resin B.

The content of the laser absorptive coloring material is preferably 0.15 parts by mass or more because the resin generates heat to melt when irradiated with laser, and the content is preferably 10.00 parts by mass or less because the resin can be prevented from decomposing through rapid and excessive heat generation.

From these points of view, the content of the laser absorptive coloring material is, with respect to 100 parts by mass of the polyester-based resin B, preferably 0.15 to 10.00 parts by mass, more preferably 5 parts by mass or less, and further preferably 1 part by mass or less.

The member II may or may not contain the laser transmissive/absorptive coloring material, for example, nigrosine. When the laser transmissive/absorptive coloring material, particularly nigrosine is not contained in the member II, heat discoloration and light discoloration can be prevented.

<Additional Components>

The member II can contain various additives if necessary. Examples of such additives include a reinforcing filler, an impact modifier, a flow modifier, an auxiliary colorant, a dispersant, a stabilizer, a plasticizer, an ultraviolet absorber, a light stabilizer, an antioxidant, an antistatic agent, a lubricant, a release agent, a crystallization accelerator, a crystal nucleating agent, a flame retardant and an epoxy compound.

<Shape of Member II>

A shape of the member II is arbitrary. It may be, for example, in a plate shape, a rectangular shape or another complicated shape. It may be an odd-shaped extruded product (such as a bar or a pipe) to be welded with an end abutted, or may be a metal-inserted molded product used in a current-carrying component, an electronic component or the like requiring high waterproofness and airtightness.

A method for molding the member II is also arbitrary. Examples include an injection molding method, a high-speed injection molding method, an injection compression molding method, a two-color molding method, a blow molding method by a gas assist method or the like, a molding method using an insulation mold, a molding method using a rapid heating mold, expansion molding (also including a supercritical fluid), insert molding, an IMC (in-mold coating molding) molding method, an extrusion molding method, a sheet molding method, a thermoforming method, a rotational molding method, a laminate molding method, a press molding method and a blow molding method.

In a case of measurement using light of a wavelength of 940 nm, when the member II has a thickness of 1.5 mm or more, the transmittance of the member II is preferably 10° or less, more preferably 5° or less, and particularly preferably 0% in view of increasing production efficiency and a welding strength of the welded body.

Besides, a reflectance of the member II is not especially limited.

<Relationship Between Member I and Member II>

In a relationship between the member I and the member II, in view of the welding strength and compressive strength, it is more preferable that a difference between a melting point Tm-A and a crystallization temperature Tc-A of the member I ((Tm-A)−(Tc-A)) be larger than a difference between a melting point Tm-B and a crystallization temperature Tc-B of the member II ((Tm-B)−(Tc-B)). The difference therebetween [((Tm-A)−(Tc-A))−((Tm-B)−(Tc-B)), hereinafter also referred to as the "difference (Tm−Tc)) between member I-member II" is preferably 0 to 30° C. more preferably 2° C. or more or 20° C. or less, further preferably 3° C. or more or 15° C. or less, and still more preferably 4° C. or more or 10° C. or less though the difference is largely affected by a resin used in the absorbing-side member.

Such a relationship may be obtained by, for example, adjustment of a mixing ratio of the polyester resin B used in the member II, selection of various additives and adjustment of their amounts used, or selection of a laser transmissive/absorptive coloring material of the polyester resin A used in the member I and adjustment of its amount used. The adjustment method is, however, not limited to these.

Besides, in view of the welding strength and compressive strength, with respect to a melting enthalpy of the member I, ΔHm-A, and a melting enthalpy of the member II, ΔHm-B, it is further preferable that the melting enthalpy of the member I, ΔHm-A, be higher than the melting enthalpy of the member II, ΔHm-B. A difference between the melting enthalpy of the member I, ΔHm-A and the melting enthalpy of the member II, ΔHm-B, [i.e., (ΔHm-A)−(ΔHm-B)] is preferably 0 to 20 J/g, more preferably 0.5 J/g or more or 10 J/g or less, and further preferably 2 J/g or more or 9 J/g or less.

Such a relationship may be obtained by, for example, adjustment of a mixing ratio of the polyester resin B used in the member II, selection of various additives and adjustment of their amounts used, or selection of a laser transmissive/absorptive coloring material of the polyester resin A used in the member I and adjustment of its amount used. An adjustment method is, however, not limited to these.

It is preferable that the melting point Tm, the crystallization temperature Tc and the melting enthalpy ΔHm be measured on a sample obtained by cutting out each of the member I and the member II formed by the injection molding, from an area away from the gate of the die for injection molding by a distance of 5 mm or more.

[Method for Producing Present Laser Welded Body]

Each of the member I and the member II may be produced by preparing a resin composition by a usual method and molding the resin composition by a usual method.

For example, raw materials for the member I or II are mixed to be molten and kneaded using a single or twin screw extruder. Alternatively, without precedently mixing the components, or with merely some of the components precedently mixed, the components may be supplied to an extruder using a feeder to be molten and kneaded to prepare a resin composition.

Alternatively, a masterbatch may be prepared by melting and kneading a mixture of a part of resins for the member I or II and a part of another resin, and subsequently, the rest of the resins and another component may be added thereto to be molten and kneaded.

When a fibrous reinforcing filler such as glass fiber is used, the filler is also preferably supplied from a side feeder provided in the middle of a cylinder of an extruder.

A heating temperature for melting and kneading can be usually appropriately selected in a range of 220 to 300° C.

When the temperature is too high, a decomposition gas is easily generated, which may cause opacification in some cases. Therefore, a screw structure is preferably selected in consideration of shear heat and the like. In order to restrain the decomposition otherwise caused in kneading or molding subsequently performed, an antioxidant or a heat stabilizer is preferably used.

As the method for molding the member I and the member II, an arbitrary method can be employed as described above.

Next, the member I and the member II may be overlapped with each other, and disposed with the member I positioned on the side of a radiation source of laser beam, and an overlapping portion between the member I and the member II may be irradiated with laser beam with a pressing force applied inward from both sides in the thickness direction.

The irradiated laser beam penetrates the member I in the thickness direction to form a vertically long molten pool reaching the member II, and the member I and the member II can be bonded to each other when this molten pool is solidified by cooling.

When the member I and the member II are overlapped with each other, for example, these members can be in a surface contact or a butt contact with each other.

Preferable conditions for laser welding will now be described in detail.

(Conditions for Laser Welding)

Next, the preferable conditions for laser welding will be described. It is not intended that the conditions be limited to the following conditions for welding.

As the conditions for laser welding, preferable conditions are preferably appropriately selected in accordance with, for example, the specification of an apparatus, the type, the diameter, and the power of laser, and the scanning speed.

Examples of the type of laser beam to be irradiated include solid laser, fiber laser, semiconductor laser, gas laser and liquid laser. For example, YAG (yttrium aluminum garnet crystal) laser (wavelength: 1064 nm, 1070 nm), LD (laser diode) laser (wavelength: 808 nm, 840 nm, 940 nm, 980 nm) or the like can be suitably used. Particularly, laser beam of a wavelength of 940 nm, 980 nm or 1070 nm is preferred.

Oscillation form may be either of CW oscillation and pulse oscillation.

The irradiation method is not also especially limited. The method can be appropriately selected from, for example, a method in which a laser head is moved by a robot, a Galvano scanning method in which laser beam is reflected on a mirror for scanning, a method in which a large number of laser heads are equipped to simultaneously irradiate a welding surface, and the like.

The laser spot diameter is preferably 0.1 mm or more and 30 mm or less, more preferably 0.2 mm or more or 10 mm or less, and further preferably 0.7 mm or more or 3.0 mm or less.

When the laser spot diameter is 0.1 mm or more, welding for obtaining a desired welding strength can be easily performed, and when it is 30 mm or less, a welding width can be easily controlled. The spot diameter of the laser beam can be selected in accordance with the width and the height of the welding surface.

Besides, the laser beam may be focused on the surface to be bonded, or may be defocused, and this is preferably appropriately selected in accordance with the welded body to be obtained.

The laser power is preferably 1 W to 1000 W, more preferably 10 W or more or 500 W or less, and further preferably 15 W or more or 200 W or less.

When the laser power is 1000 W or less, higher cost of laser welding machinery can be avoided, and when it is 1 W or more, an adequate welding strength can be easily obtained.

The laser scanning speed is preferably 0.1 mm/s to 20000 mm/s, more preferably 1 mm/s or more or 10000 mm/s or less, and further preferably 10 mm/s or more or 1000 mm/s or less.

Besides, with respect to the laser scanning method, the laser power, a welding line programed, a scanning speed and/or a scanning method are preferably tailored in accordance with the shape of the surface to be bonded in view of welding efficiency, a welding strength, an appearance of a welded portion and a device load.

In performing the laser welding, the member I and the member II are first overlapped with each other, and the overlapped state of the member I and the member II is retained. In retaining the overlapped state, a transparent plate such as a glass plate, a quartz plate or an acrylic plate may be placed on the transmitting-side member I, namely, on the laser irradiation side. Particularly, a glass plate or a quartz plate is placed suitably for accelerating release of heat generated at the time of the laser welding, and obtaining a good appearance.

Next, the portion programed to be welded, which corresponds to a peripheral portion of the member II, is irradiated with the laser beam by scanning from above the member I. At this time, almost whole or most of the laser beam is transmitted through the member I and partly absorbed. Then, the laser beam is absorbed by the surfaces to be bonded of the member I and the member II to generate heat in the vicinity of the surfaces to be bonded, and thus the surface to be bonded are molten.

In this manner, the surfaces to be bonded of the member II and the member I are molten into each other, and after stopping the irradiation with the laser beam, the molten portions of the member I and the member II are cooled to be solidified, and these members are thus welded and integrated with each other with a high strength.

At this time, a pressing force (N/mm) is preferably applied to these members using a jig or pressing means at least in bonding these members by the laser welding.

The pressing force (N/mm) is preferably 0.0002 N/mm or more and 160 N/mm or less, more preferably 80 N/mm or less, further preferably 50 N/mm or less, still more preferably 40 N/mm or less, still more preferably 30 N/mm or less, and particularly preferably 20 N/mm or less. When a pressing force falling in this range is applied, a residual stress minimally remains in the molded product to reduce warpage deformation, and thus an adequate welding strength is easily obtained.

On the other hand, a lower limit is preferably 0.4 N/mm or more. When it is 0.4 N/mm or more, adhesion on the surfaces to be bonded is easily adequately retained, and the welding can be easily adequately performed.

However, in molding a member for which a laser scanning distance is long, for example, a member for which a laser scanning distance is 200 mm or more, the pressing force (N/mm) is preferably 10 N/mm or less, particularly preferably 9 N/mm or less, more particularly preferably 5 N/mm or less, and most preferably 3 N/mm or less.

The pressing force (N/mm) is a pressing force per unit distance, and for example, an actual pressing force (N) is measured with a coin-shaped load cell (LM-20M, manufactured by Imada Co., Ltd.) set on a pressing stage equipped with a pressure cylinder (air cylinder (000 mm) manufactured by SMC). The thus obtained actual pressing force (N)

is divided by a cyclic length (mm) of the line programed to be welded to obtain a pressing force (N/mm) per unit distance.

A gap welding strength of the present laser welded body (gap: 0.2 mmt; welding conditions employed are those for a dumbbell piece described later) is preferably 400 N or more, more preferably 500 N or more, and further preferably 600 N or more.

A welding strength of the present laser welded body (welding conditions employed are those for a cup shape described later; pressing force: 4.92 N/mm) is preferably 500 N or more, more preferably 550 N or more, and further preferably 600 N or more.

A compressive strength of the present laser welded body (conditions employed are those for the cup shape described later; pressing force: 15.8 N/mm) is preferably 400 kPa or more, more preferably 600 kPa or more, and further preferably 850 kPa or more.

The test pieces used in the measurement of each of these strengths are in a size weldable under the stated pressing force.

(Welding Conditions for Dumbbell Piece)
Laser Welder: FD-2330 manufactured by Fine Device Co., Ltd.
Wavelength: 940 nm
Power: 80 W
Spot Diameter: 2.1 mmϕ
Scanning Speed: 30 mm/s
Irradiation Energy: 2.67 J/mm
Scanning Distance: 16 mm
Pressing Force: 44.9 N/mm
(Welding Conditions for Cup Shape)
Laser Welder: FD-2330 manufactured by Fine Device Co., Ltd.
Power: 140 W
Spot Diameter: 2.1 mmϕ
Scanning Speed: 93 mm/s
Irradiation Energy: 1.51 J/mm
Scanning Distance: 137 mm The present welded body may be arbitrary in shape, size, thickness and the like, and can be used in various applications. Examples include electrical components for transport equipment such as a vehicle, electric/electronic components, and components of industrial machinery or other consumer use. In particular, since the present welded body has a high welding strength and also a high compressive strength, it is particularly preferably used in application requiring air tightness, such as a vessel for accommodating an electric/ electronic component such as an electronic board, a circuit, a sensor, a solenoid, a motor, a transformer or a battery.

<Terms>

Herein, an expression of "X to Y" (wherein X and Y are arbitrary numerical values) has not only a meaning of "X or more and Y or less" but also a meaning of "preferably more than X" or "preferably less than Y" unless otherwise stated.

Besides, an expression of "X or more" (wherein X is an arbitrary numerical value) or "Y or less" (wherein Y is an arbitrary numerical value) encompasses an intention of "preferably more than X" or "preferably less than Y".

EXAMPLES

The present invention will now be described in more details with reference to examples.

<Optical Characteristics: Measurement of Transmittance and Reflectance>

A resin composition pellet obtained in each of examples and comparative examples described below, namely, each resin composition pellet for forming a member I shown in Table 3 below or each resin composition pellet for forming a member II shown in Tables 4 and 5 below, was dried at 120° C. for 7 hours, and then injection molded using an injection molding machine ("NEX80-9E" manufactured by Nissei Plastic Industrial Co., Ltd.) at a cylinder temperature of 260° C. and a mold temperature of 60° C. under the following injection conditions, into a plate-shaped test piece having a size of 60 mm×60 mm×thickness of 1.5 mm to be used for measurement of a transmittance and a reflectance.

(Injection Conditions)
Dwelling Time: 15 sec
Cooling Time: 15 sec
Injection Speed: 120 mm/sec
Back Pressure: 4 MPa
Screw Speed: 80 rpm On the test piece (60 mm×60 mm×thickness of 1.5 mm) obtained as described above, a transmittance (%) and a reflectance (%) at a wavelength of 940 nm were determined in the portion that was positioned at a distance of 35 mm from a gate side portion, had a width of 10 mm and a length of 20 mm, and was positioned in the center in the widthwise direction of the test piece, by using an ultraviolet, visible and near-infrared spectrophotometer ("UV-3100PC" manufactured by Shimadzu Corporation), and the results are shown as the transmittance and the reflectance of the member I or the member II in Table 3.

<Method for Measuring Color Tone>

A resin composition pellet obtained in each of the examples and comparative examples described below, namely, each resin composition pellet for forming a member I shown in Table 3 below or each resin composition pellet for forming a member II shown in Tables 4 and 5 below, was dried at 120° C. for 7 hours, and then injection molded using an injection molding machine ("NEX80-9E" manufactured by Nissei Plastic Industrial Co., Ltd.) at a cylinder temperature of 260° C. and a mold temperature of 60° C. under the same injection conditions as those employed for molding the test piece for the measurement of the transmittance and the reflectance, into a plate-shaped test piece having a size of 60 mm×60 mm×thickness of 3 mm to be used for measurement of a color tone.

The L* value (SCE) of the thus obtained plate-shaped test piece was measured, and the result is shown as the L* value of the member I or the member II in Table 3, 4 or 5. The measurement was performed by using a spectrocolorimeter (CM-3600d manufactured by Konica Minolta Optics, Inc.) in accordance with ISO7724/1 with D65/10 (reflected illumination, light entering from 10° direction) by a SCE (specular component excluded) calorimetric method using a target mask CM-A (ϕ 8 mm).

<Method for Measuring Amount of Warpage>

A resin composition pellet obtained in each of the examples and comparative examples described below, namely, each resin composition pellet for forming a member I shown in Table 3 below or each resin composition pellet for forming a member II shown in Tables 4 and 5 below, was dried at 120° C. for 7 hours, and then molded using an injection molding machine, "Model SE-50D" manufactured by Sumitomo Heavy Industries, Ltd. at a cylinder temperature of 260° C. and a mold temperature of 80° C., into a rectangular parallelepiped box-shaped molded article illustrated in FIG. 6.

Figure 6:
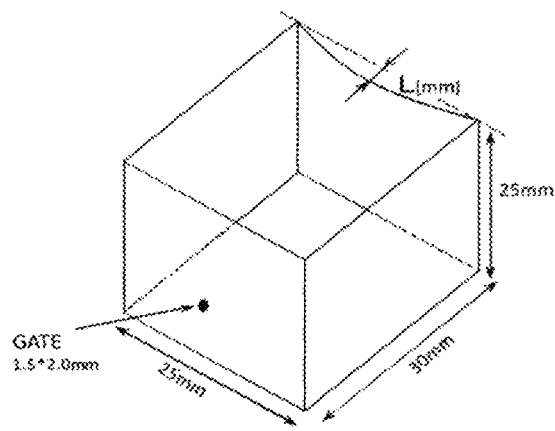
FIG. 6 is an explanatory diagram illustrating a method for measuring warpage employed in the example.

FIG. 6 is a perspective view of the box-shaped molded article used for evaluating warpage, and illustrates a state where the molded article is disposed with a bottom surface facing downward. The box-shaped molded article has a width of 25 mm, a length of 30 mm, a height of 25 mm, and a thickness of 1 mm in the bottom surface and 0.5 mm in the other side surfaces. The gate is a substantially elliptical one point gate having a major axis of 2.0 mm and a minor axis of 1.5 mm, and is a submarine gate (illustrated as GATE in FIG. 6) in the center on the side surface on the near side in FIG. 6.

The molded product thus molded was placed with the bottom surface of the box shape facing downward, and an inward warpage length L at an apex of the side surface on the back side in FIG. 6 when the side surface on the back side was warped inward of the box was measured (unit: mm). The results are shown as the amount of warpage of the member I or II in Table 3, Table 4 or Table 5.

As this value is smaller, the amount of the inward warpage of the molded product is smaller, and hence dimensional accuracy is better.

<Methods for Measuring Melting Point Tm, Crystallization Temperature Tc, and Melting Enthalpy ΔHm>

A resin composition pellet obtained in each of the examples and comparative examples described below, namely, each resin composition pellet for forming a member I shown in Table 3 below, was dried at 120° C. for 7 hours, and then molded using an injection molding machine ("J55" manufactured by The Japan Steel Works, Ltd.) at a cylinder temperature of 260° C. and a mold temperature of 60° C. to produce a black or milky white molded article (member I) having a thickness of 1.5 mm as illustrated in FIG. 1.

The portion programed to be welded (portion away from a gate by 33 mm) of the molded article of the thus produced member I was cut out, and the melting point Tm, the crystallization temperature Tc and the melting enthalpy ΔHm thereof were measured using a differential scanning calorimetric (DSC) device ("Pyris Diamond" manufactured by Perkin Elmer Co., Ltd.) under a nitrogen atmosphere by increasing a temperature from 30° C. to 300° C. at a temperature increasing rate of 20° C./min, retaining the temperature at 300° C. for 3 minutes, and reducing the temperature at a temperature reducing rate of 20° C./min. The results are shown as Tm, Tc, Tm–Tc and ΔHm of the member I in Tables 6 to 8.

"Difference (Tm–Tc) between Member I-Member II" of Tables 6 to 8 refers to the difference "((Tm-A)–(Tc-A))–((Tm-B)–(Tc-B))", which is the difference between the difference between the melting point Tm-A and the crystallization temperature Tc-A, (Tm-A)–(Tc-A), of the member I and the difference between the melting point Tm-B and the crystallization temperature Tc-B, (Tm-B)–(Tc-B), of the member II.

Figure 2:
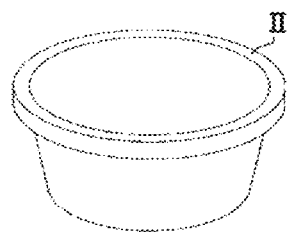
FIG. 2 is a diagram of a member II produced in the examples.
Figure 2:
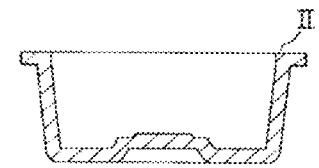

A resin composition pellet obtained in each of the examples and comparative examples described below, namely, each resin composition pellet for forming a member II shown in Table 4 below, was dried at 120° C. for 7 hours, and then molded using an injection molding machine ("J55" manufactured by The Japan Steel Works, Ltd.) at a cylinder temperature of 260° C. and a mold temperature of 60° C. to produce a black or milky white molded article (member II) having a thickness of 1.5 mm as illustrated in FIG. 2.

The portion programed to be welded (portion away from a gate by 33 mm) of the molded article of the thus produced member II was cut out, and the melting point Tm, the crystallization temperature Tc and the melting enthalpy ΔHm thereof were measured using a differential scanning calorimetric (DSC) device ("Pyris Diamond" manufactured by Perkin Elmer Co., Ltd.) under a nitrogen atmosphere by increasing a temperature from 30° C. to 300° C. at a temperature increasing rate of 20° C./min, retaining the temperature at 300° C. for 3 minutes, and reducing the temperature at a temperature reducing rate of 20° C./min. The results are shown as Tm, Tc, Tm–Tc and ΔHm of the member II in Tables 6 to 8.

In Tables 6 to 8, Tm1 refers to the melting point measured by DSC. When there are a plurality of melting points, the lowest melting point is referred to as Tm1, and the highest melting point is referred to as Tm2. TC1 refers to a crystallization temperature measured by DSC. In Tm–Tc, Tm means the melting point, and Tc means the crystallization temperature.

<Production of Member I>

For producing a member I, a dye/pigment obtained by mixing components shown in Table 2 below in a ratio shown in Table 2 was used.

TABLE 2

| | | | (Y) Dye/pigment Principally Transmitting Laser Beam | | |
|---|---|---|---|---|---|
| | | | Y-1 | Y-2 | Y-3 |
| Composition Ratio/in parts by mass | C1 Anthraquinone Dye | Solvent Blue 104 (λ max: 628 nm) | 0.66 | 0.49 | |
| | C2 Perinone Dye | Solvent Red 179 (λ max: 472 nm) | 0.58 | 0.84 | |
| | C3 Anthraquinone Dye | Solvent Yellow 163 (λ max: 446 nm) | 0.56 | 0.47 | |
| | Triphenylmethane Dye | Solvent Blue 23 (λ max: 530 nm) | | | 0.40 |
| | Azomethine Dye | Solvent Brown 53 (λ max: 436 nm) | | | 0.80 |
| Mass Ratio of Anthraquinone Dye C1: | | | 37: | 27: | — |
| Perinone Dye C2: | | | 32: | 47: | |
| Anthraquinone Dye C3 | | | 31 | 26 | |
| C2/C1 Ratio | | | 0.88 | 1.71 | — |

Components shown in Table 3 below in a mixing ratio shown in Table 3 were put in a stainless steel tumbler, produce a black or milky white molded article (member I) having a thickness of 1.5 mm as illustrated in FIG. 1.

TABLE 3

| Component | Member I (Transmitting-side Member) | a-1 | b-1 | b-2 | b-3 | b-4 | b-5 | b-6 |
|---|---|---|---|---|---|---|---|---|
| PBT | Polybutylene terephthalate homopolymer Amount of terminal carboxyl group: 13 eq/ton Intrinsic viscosity: 0.85 dl/g | 100 | 50 | 50 | 50 | 50 | | 50 |
| Copolymerized PBT | Polybutylene terephthalate resin copolymerized with 10 mol % of isophthalic acid instead of terephthalic acid Intrinsic viscosity: 0.84 dl/g Amount of terminal carboxyl group: 20 eq/ton | | 50 | 50 | 50 | 50 | | 50 |
| | Polybutylene terephthalate resin copolymerized with 5 mol % of isophthalic acid instead of terephthalic acid Intrinsic viscosity: 0.84 dl/g Amount of terminal carboxyl group: 20 eq/ton | | | | | | 100 | |
| Glass Fiber | Trade name: T-187, manufactured by Nippon Electric Glass Co., Ltd. Average fiber diameter: 13.5 μm, Cut length of chopped strand: 3 mm | 43 | 43 | 43 | 43 | 43 | 43 | 43 |
| Dye/pigment (X) | Nigrosine Trade name: NUBIAN BLACK TH-807, manufactured by Orient Chemical Industries Co., Ltd. | 0.014 | 0.014 | | 0.014 | 0.014 | 0.014 | 0.020 |
| Dye/pigment (Y) | Y-1 | 0.386 | 0.386 | | | | 0.386 | 0386 |
| | Y-2 | | | | 0.386 | | | |
| | Y-3 | | | | | 0.275 | | |
| Stabilizer | Pentaerythritol tetrakis (3-(3,5-di-tert-butyl-4-hydroxyphenyl) propionate) Trade name: Adekastab AO-60, manufactured by ADEKA | 0.43 | 0.43 | 0.43 | 0.43 | 0.43 | 0.43 | 0.43 |
| Release Agent | Polyethylene oxide wax Trade name: Licowax PED522, manufactured by Clariant Japan | 0.72 | 0.72 | 0.72 | 0.72 | 0.72 | 0.72 | 0.72 |
| Optical Characteristics | Transmittance (%) | 22.3 | 21.3 | 43.2 | 23.4 | 21.1 | 20.4 | 21.3 |
| | Reflectance (%) | 31.6 | 33.4 | 38.6 | 33.5 | 33.4 | 34.5 | 33.4 |
| Color Tone | L* | 33.1 | 33.3 | 69.3 | 33.4 | 33.5 | 33.5 | 33.3 |
| Warpage | Amount of Warpage (mm) | 0.586 | 0.382 | 0.381 | 0.383 | 0.384 | 0.352 | 0.382 |
| Ratio of Dyes | Y/X | 27.6 | 27.6 | — | 27.6 | 19.6 | 27.6 | 19.3 | followed by stirring and mixing for 1 hour. The thus obtained mixture was placed in a main hopper of a 30 mm bent-type twin screw extruder ("TEX30α" manufactured by The Japan Steel Works, Ltd.), and kneaded with glass fiber supplied from a hopper through a side feeder under conditions of an extruder barrel set temperature of 260° C., a die temperature of 250° C., a screw speed of 200 rpm, and a discharge amount of 40 kg/hr. and extruded into a strand to obtain a resin composition pellet.

The thus obtained pellet was dried at 120° C. for 7 hours, and then molded using an injection molding machine ("J55" manufactured by The Japan Steel Works, Ltd.) at a cylinder temperature of 260° C. and a mold temperature of 60° C. to <Production of Member II>

Components shown in Table 4 or 5 below in a mixing ratio shown in Table 4 or 5 were put in a stainless steel tumbler, followed by stirring and mixing for 1 hour. The thus obtained mixture was placed in a main hopper of a 30 mm bent-type twin screw extruder ("TEX30α" manufactured by The Japan Steel Works, Ltd.), and kneaded with glass fiber supplied from a hopper through a side feeder under conditions of an extruder barrel set temperature of 260° C., a die temperature of 250° C., a screw speed of 200 rpm, and a discharge amount of 40 kg/hr. and extruded into a strand to obtain a resin composition pellet.

The thus obtained pellet was dried at 120° C. for 7 hours, and then molded, using an injection molding machine ("J55" manufactured by The Japan Steel Works, Ltd.) at a cylinder temperature of 260° C. and a mold temperature of 60° C. to produce a black or milky white molded article (member II) as illustrated in FIG. 2.

The optical characteristics, the color tone, the amount of warpage, the melting point Tm, the melting enthalpy ΔHm and the crystallization temperature Tc were measured in the same manner as described for the member I. The melting point Tm, the melting enthalpy ΔHm and the crystallization temperature Tc were measured in the portion programed to be welded (portion away from a gate by 42 mm) of the molded article of the member II thus produced.

TABLE 4

| Component | Member II (Absorbing-side Member) | b-1 | A-1 | A-2 | A-3 | A-4 | A-5 |
|---|---|---|---|---|---|---|---|
| PBT | Polybutylene terephthalate homopolymer Intrinsic viscosity: 0.85 dl/g Amount of terminal carboxyl group: 13 eq/ton | 50 | 100 | 100 | 100 | 100 | 100 |
| Copolymerized PBT | Polybutylene terephthalate resin copolymerized with 10 mol % of isophthalic acid instead of terephthalic acid Intrinsic viscosity: 0.84 dl/g Amount of terminal carboxyl group: 20 eq/ton | 50 | | | | | |
| PET | Polyethylene Terephthalate Resin Intrinsic viscosity: 0.64 dl/g Amount of terminal carboxyl group: 36 eq/ton | | | | | | |
| AS resin | Acrylonitrile-styrene copolymer Mass average molecular weight: 150000 MFR: 11 g/10 min (220° C., 98N) Acrylonitrile content: 31 mass % | | | | | | |
| HIPS | Rubber-modified polystyrene resin (HIPS) MFR: 3 g/10 min (200° C., 49N) Butadiene rubber content: 7.4 mass % Mass average molecular weight: about 200000 | | | | | | |
| PC | Polycarbonate resin (PC) Viscosity average molecular weight: 16,000 Mw (19200)/Mn (7900) Amount of terminal hydroxyl group: 200 ppm | | | | | | |
| Glass Fiber | Trade name: T-187, manufactured by Nippon Electric Glass Co., Ltd. Average fiber diameter: 13.5 μm, Cut length of chopped strand: 3 mm | 43 | 43 | 43 | 43 | 43 | 43 |
| Coloring Material | Carbon black Trade name: #650B, manufactured by Mitsubishi Chemical Corporation Particle size: 22 nm | | 0.270 | | 0.040 | 0.550 | 0.140 |
| | Nigrosine Trade name: NUBIAN BLACK TH-807, manufactured by Orient Chemical Industries Co., Ltd. | 0.014 | | | | | 0.140 |
| | Dye/pigment (Y) Y-1 | 0.386 | | | | | |
| Stabilizer | Pentaerythritol tetrakis [3-(3,5-di-tert-butyl-4-hydroxyphenyl)propionate] Trade name: Adekastab AO-60, manufactured by ADEKA | 0.43 | 0.43 | 0.43 | 0.43 | 0.43 | 0.43 |
| Stabilizer | Mixture of $O=P(OH)_n$-$(OC_{13}H_{37})_{3-n}$, wherein n = 1.2 Trade name: Adekastab AX-71, manufactured by ADEKA | | | | | | |

TABLE 4-continued

| Component | Member II (Absorbing-side Member) | b-1 | A-1 | A-2 | A-3 | A-4 | A-5 |
|---|---|---|---|---|---|---|---|
| Release Agent | Polyethylene oxide wax Trade name: Licowax PE D522, manufactured by Clariant Japan | 0.72 | 0.72 | 0.72 | 0.72 | 0.72. | 0.72 |
| Color Tone | $L^*$ | 33.3 | 30.51 | 71.35 | 32.38 | 29.17 | 29.17 |
| Warpage | Amount of Warpage (mm) | 0.382 | 0.587 | 0.587 | 0.587 | 0.587 | 0.587 |
| Optical Characteristics | Transmittance (%) | 21.3 | 0 | 29.7 | 0 | 0 | 0 |
| | Reflectance (%) | 33.4 | 1.3 | 49.9 | 1.3 | 1.3 | 1.3 |

TABLE 5

| Component | Member II (Absorbing-side Member) | B | C | D | E | F | G-1 | G-2 | G-3 | G-4 |
|---|---|---|---|---|---|---|---|---|---|---|
| PBT | Polybutylene terephthalate homopolymer Intrinsic viscosity: 0.85 dl/g Amount of terminal carboxyl group: 13 eq/ton | 50 | 70 | 70 | 60 | 90 | | | | |
| Copolymerized PBT | Polybutylene terephthalate resin copolymerized with 10 mol % of isophthalic acid instead of terephthalic acid Intrinsic viscosity: 0.84 dl/g Amount of terminal carboxyl group: 20 eq/ton | 50 | | | | | 100 | 85 | 85 | 80 |
| PET | Polyethylene Terephthalate Resin Intrinsic viscosity: 0.64 dl/g Amount of terminal carboxyl group: 36 eq/ton | | 30 | | | | | 15 | | |
| AS resin | Acrylonitrile-styrene copolymer Mass average molecular weight: 150000 MFR: 11 g/10 min (220° C., 98N) Acrylonitrile content: 31 mass % | | | | | 10 | | | | |
| HIPS | Rubber-modified polystyrene resin (HIPS) MFR: 3 g/10 min (200° C., 49N) Butadiene rubber content: 7.4 mass % Mass average molecular weight: about 200000 | | | | 30 | | | | | 15 |
| PC | Polycarbonate resin (PC) Viscosity average molecular weight: 16,000 Mw (19200)/Mn (7900) Amount of terminal hydroxyl group: 200 ppm | | | 30 | 10 | | | | 15 | 5 |
| Glass Fiber | Trade name: T-187, manufactured by Nippon Electric Glass Co., Ltd. Average fiber diameter: 13.5 μm Cut length of chopped strand: 3 mm | 43 | 43 | 43 | 43 | 43 | 43 | 43 | 43 | 43 |

TABLE 5-continued

| Component | Member II (Absorbing-side Member) | B | C | D | E | F | G-1 | G-2 | G-3 | G-4 |
|---|---|---|---|---|---|---|---|---|---|---|
| Coloring Material | Carbon black Trade name: #650B, manufactured by Mitsubishi Chemical Corporation Particle size: 22 nm Nigrosine Trade name: NUBIAN BLACK TH-807, manufactured by Orient Chemical Industries Co., Ltd. Dye/pigment (Y) Y-1 | 0.270 | 0.270 | 0.270 | 0.270 | 0.270 | 0.27 | 0.27 | 0.27 | 0.27 |
| Stabilizer | Pentaerythritol tetrakis [3-(3,5-di-tert-butyl-4-hydroxyphenyl)propionate] Trade name: Adekastab AO-60, manufactured by ADEKA | 0.43 | 0.43 | 0.43 | 0.43 | 0.43 | 0.43 | 0.43 | 0.43 | 0.43 |
| Stabilizer | Mixture of $O=P(OH)_n$-$(OC_{13}H_{37})_{3-n}$, wherein n = 1.2 Trade name: Adekastab AX-71, manufactured by ADEKA | 0.14 | 0.14 | 0.14 | | | 0.14 | 0.14 | 0.14 | |
| Release Agent | Polyethylene oxide wax Trade name: Licowax PED522, manufactured by Clariant Japan | 0.72 | 0.72 | 0.72 | 0.72 | 0.72 | 0.72 | 0.72 | 0.72 | 0.72 |
| Color Tone | L* | 30.67 | 30.25 | 30.42 | 30.34 | 30.43 | 30.55 | 30.22 | 30.34 | 30.33 |
| Warpage | Amount of Warpage (mm) | 0.382 | 0.378 | 0.334 | 0.302 | 0.392 | 0.353 | 0.312 | 0.294 | 0.321 |
| Optical Characteristics | Transmittance (%) | 0 | 0 | 0 | 0 | 0 | 0 | 0 | 0 | 0 |
| | Reflectance (%) | 1.3 | 1.3 | 1.3 | 1.3 | 1.3 | 1.3 | 1.3 | 1.3 | 1.3 |

<Production of Laser Welded Body>

Figure 3:
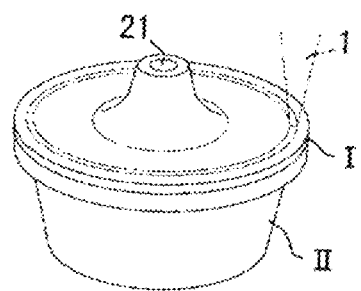
FIG. 3 is a perspective view illustrating an example of a state where the members I and II produced in each example are laser welded.

The member I and the member II were selected in each combination shown in Tables 6 to 8 below, and holes 21 and 22 were made as illustrated in FIG. 3. With jigs 23 and 24 to be used for measurement of a welding force disposed inside, the member I in a lid-like shape was overlapped on the member II in a box shape, and a source of laser beam was disposed in a position vertically above a flange portion corresponding to an overlapping portion between the member I and the member II. Under application of a pressing force (pressing force at the time of welding) of 4.92 N/mm or 15.8 N/mm by using glass plates to the overlapping portion between the member I and the member II inward from the both sides in the thickness direction, one cyclic scanning was performed by scanning with laser under the following conditions, and the resultant was cooled to obtain a laser welded body.

The welding conditions were as follows:
Laser Welder: FD-2330 manufactured by Fine Device Co., Ltd.
Wavelength: 940 nm
Power: 140 W
Spot Diameter: 2.1 mmϕ
Scanning Speed: 93 mm/s
Irradiation Energy: 1.51 J/mm
Scanning Distance: 137 mm <Evaluation of Laser Welding Strength: Cup Shape>

Figure 4:
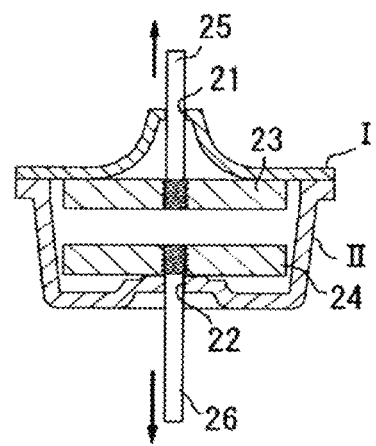
FIG. 4 is an explanatory diagram illustrating a method for measuring a welding strength (cup shape) employed in the example.

As illustrated in FIG. 4, jigs 25 and 26 to be used for the measurement were inserted respectively from upper and lower sides of the box formed by the member I and the member II produced as described above so that the member I and the member II are respectively linked with the jigs 23 and 24 disposed inside. The jigs were vertically pulled (pulling speed: 5 ram/min) and the strength (welding strength) necessary to separate the member I and the member II from each other was measured. When the member I and the member II were peeled off from each other before this test, however, the test could not be performed (which is shown as "n.d." in the table).

Universal test machine 5544 manufactured by Instron was used.

<Evaluation of Laser Welding Strength: Overlap Welding of Dumbbell Pieces, Gap Welding Strength>

Components shown in Table 3, 4 or 5 below in a mixing ratio shown in Table 3, 4 or 5 were put in a stainless steel tumbler, followed by stirring and mixing for 1 hour. The thus obtained mixture was placed in a main hopper of a 30 mm bent-type twin screw extruder ("TEX30α" manufactured by The Japan Steel Works, Ltd.), and kneaded with glass fiber supplied from a hopper through a side feeder under conditions of an extruder barrel set temperature of 260° C., a die temperature of 250° C., a screw speed of 200 rpm, and a discharge amount of 40 kg/hr. and extruded into a strand to obtain a resin composition pellet.

Figure 5:
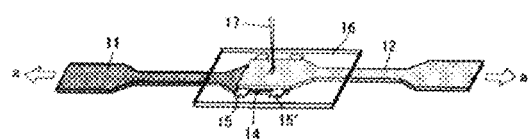
FIG. 5 is an explanatory diagram illustrating a method for measuring the welding strength (dumbbell piece) employed in the example.

The thus obtained pellet was dried at 120° C. for 7 hours, and then molded using an injection molding machine ("J55" manufactured by The Japan Steel Works, Ltd.) at a cylinder temperature of 260° C. and a mold temperature of 60° C. at an injection speed of 100 mm/sec to produce a dumbbell piece having a thickness of 1.5 mm. A black or milky white molded article (members I and II) as illustrated in FIG. 5 was produced.

Two ASTM No. 4 dumbbells 11 and 12 of the member I and the member II having a thickness of 1.5 mm obtained as described above were used, and a laser welder manufactured by Fine Device Co., Ltd. (laser wavelength: 940 nm, laser spot diameter: φ2.1 mm, distance between a laser head and a test piece: 79.7 mm) was used. As illustrated in FIG. 5, the dumbbell 11 and the dumbbell 12 were overlapped with each other in end portions thereof, each end portion being opposite to the resin injection gate (being on the opposite side to the gate), metal piece spacers 15 and 15' were disposed therebetween in an overlapping portion 14 thus obtained, and the resultant was placed on a glass table (not shown). A glass plate 16 was placed on the dumbbells 11 and 12, and with a pressure of 44.9 N/mm applied from above, welding was performed by irradiation with a laser beam 17 under conditions of laser power of 80 W, a laser scanning speed of 30 mm/sec, and a laser scanning distance of 16 mm. At this time, the laser welding was also performed with a gap of 0.2 mm formed by the metal spacers 15 and 15'. A universal test machine 5544 manufactured by Instron was used to apply a load in pulling directions illustrated with arrows a in FIG. 5 under conditions of a span length of 160 mm and a pulling speed of 5 ram/min, and thus, a breaking load (unit: N) was obtained. When the member I and the member II were peeled off from each other before this test, however, the test could not be performed (which is shown as "n.d." in the table).

<Evaluation of Compressive Strength>

A hole having a diameter of 3.5 mm was made in a center recessed portion of the member I of the welded body having been welded under a pressing force of 15.8 N/mm, and a coupler for injecting water was connected to the hole. First, the inside of the welded body was filled with water, and the resultant was immersed in water at 25° C. Next, water was started to be fed into the welded body, and an internal pressure is thus applied to the welded body by an increment of 196 kPa. The pressure applied when the pressure was released through a welded portion (when the pressure was lowered) was defined as a maximum burst pressure. When the member I and the member II were peeled off from each other before this test, however, the test could not be performed (which is shown as "n.d." in the table).

A "bottle compression tester" manufactured by Toyo Seiki Seisaku-sho, Ltd. was used.

<Anti-Bleed Performance>

The welded body produced as described above was placed, with the member II disposed below, on a PBT homopolymer resin (NOVADURAN® 5010R5 natural) plate (hereinafter referred to as the natural plate), and the resultant was put in an oven to heat at 120° C. for 8 hours. It was observed whether or not the coloring material had transferred to the natural plate in contact with the member II to make evaluation based on the following criteria. When the member I and the member II were peeled off from each other before this test, however, the test could not be performed (which is shown as "n.d." in the table).

○ (good): Bleed-out was not observed.

X (poor): Bleed-out was observed.

TABLE 6

| | | Example 1 | Example 2 | Example 3 | Example 4 | Example 5 | Example 6 | Example 7 |
|---|---|---|---|---|---|---|---|---|
| Member I | Transmitting-side Member | b-1 | b-1 | b-1 | b-1 | b-1 | b-1 | b-3 |
| Member II | Absorbing-side Member | A-1 | A-4 | C | D | E | F | F |
| Welding Strength (N) (test piece: cup shape) | Pressing force in welding 4.92N/mm | 659 | 679 | 703 | 667 | 594 | 607 | 586 |
| Welding Strength (N) (test piece: dumbbell piece) | Overlap welding Pressing force in welding 44.9N/mm | 794 | 931 | 873 | 816 | 730 | 758 | 758 |
| | 0.2 mmt gap welding Pressing force in welding 44.9N/mm | 502 | 589 | 548 | 513 | 425 | 434 | 411 |
| Compressive Strength (kPa) | Pressing force in welding 15.8 N/mm | 937 | 983 | 953 | 928 | 871 | 889 | 888 |
| Anti-bleed Performance | 120° C. × 8 h | ○ | ○ | ○ | ○ | ○ | ○ | ○ |
| Member I | Tm 1 (° C.) | 220.2 | 220.2 | 220.2 | 220.2 | 220.2 | 220.2 | 221.1 |
| | Tm 2 (° C.) | — | — | — | — | — | — | — |
| | Tm 1 (° C.) | 176.3 | 176.3 | 176.3 | 176.3 | 176.3 | 176.3 | 177.5 |
| | Tm-Tc (° C.) | 43.9 | 43.9 | 43.9 | 43.9 | 43.9 | 43.9 | 43.6 |
| | ΔHm (J/g) | 31.5 | 31.5 | 31.5 | 31.5 | 31.5 | 31.5 | 31.1 |
| Member II | Tm 1 (° C.) | 226.9 | 229.5 | 224.5 | 225.6 | 225.2 | 223.2 | 223.2 |
| | Tm 2 (° C.) | — | — | 256.8 | — | — | — | — |
| | Tc 1 (°C.) | 190.0 | 192.4 | 179.3 | 196.3 | 186.7 | 186.7 | 186.7 |
| | Tm-Tc (° C.) | 36.9 | 37.1 | 45.2 | 29.3 | 38.6 | 36.5 | 36.5 |
| | ΔHm (J/g) | 38.6 | 37.1 | 30.7 | 28.2 | 23.4 | 23.8 | 23.8 |

TABLE 6-continued

|  |  | Example 1 | Example 2 | Example 3 | Example 4 | Example 5 | Example 6 | Example 7 |
|---|---|---|---|---|---|---|---|---|
| Relationship between Member I and Member II | Difference (Tm-Tc) between Member I-Member II | 7.0 | 6.8 | −1.3 | 14.6 | 5.3 | 7.4 | 7.1 |
|  | Difference (ΔHm) between Member I-Member II | −7.1 | −5.6 | 0.8 | 3.3 | 8.1 | 7.7 | 7.3 |

TABLE 7

|  |  | Example 8 | Example 9 | Example 10 | Example 11 | Example 12 | Example 13 |
|---|---|---|---|---|---|---|---|
| Member I | Transmitting-side Member | b-4 | b-5 | b-1 | b-1 | b-1 | b-6 |
| Member II | Absorbing-side Member | F | F | G-2 | G-3 | G-4 | A-1 |
| Welding Strength (N) (test piece: cup shape) | Pressing force in welding 4.92N/mm | 571 | 623 | 689 | 621 | 632 | 638 |
| Welding Strength (N) (test piece: dumbbell piece) | Overlap welding Pressing force in welding 44.9N/mm | 760 | 775 | 945 | 922 | 883 | 752 |
|  | 0.2 mmt gap welding Pressing force in welding 44.9 N/mm | 405 | 478 | 643 | 593 | 573 | 428 |
| Compressive Strength (kPa) | Pressing force in welding 15.8N/mm | 887 | 893 | 998 | 987 | 972 | 882 |
| Anti-bleed Performance | 120° C. 8 h | ◯ | ◯ | ◯ | ◯ | ◯ | ◯ |
| Member I | Tm 1 (° C.) | 221.4 | 220.1 | 220.2 | 220.2 | 220.2 | 220.2 |
|  | Tm 2 (° C.) | — | — | — | — | — | — |
|  | Tc 1 (° C.) | 179.8 | 176.2 | 176.3 | 176.3 | 176.3 | 176.1 |
|  | Tm-Tc (° C.) | 41.6 | 43.9 | 43.9 | 43.9 | 43.9 | 44.1 |
|  | ΔHm (J/g) | 31.0 | 31.8 | 31.5 | 31.5 | 31.5 | 31.3 |
| Member II | Tm 1 (° C.) | 223.2 | 223.2 |  |  |  | 226.9 |
|  | Tm 2 (° C.) | — | — |  |  |  | — |
|  | Tc 1 (° C.) | 186.7 | 186.7 |  |  |  | 190.0 |
|  | Tm-Tc (° C.) | 36.5 | 36.5 |  |  |  | 36.9 |
|  | ΔHm (J/g) | 23.8 | 23.8 |  |  |  | 38.6 |
| Relationship between Member I and Member II | Difference (Tm-Tc) between Member I-Member II | 5.1 | 7.4 |  |  |  | 7.2 |
|  | Difference (ΔHm) between Member I-Member II | 7.2 | 8.0 |  |  |  | −7.3 |

TABLE 8

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Member I | Transmitting-side Member | a-1 | a-1 | a-1 | b-1 | b-1 | b-1 | b-1 | b-2 | b-1 | b-1 |
| Member II | Absorbing-side Member | E | F | A-1 | A-2 | A-3 | A-5 | b-1 | A-1 | B | G-1 |
| Welding Strength (N) (test piece: cup shape) | Pressing force in welding 4.92N/mm | 509 | 518 | 479 | n.d. | n.d. | 298 | n.d. | 279 | 452 | 442 |

TABLE 8-continued

| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Welding Strength (N) (test piece: dumbbell piece) | Overlap welding Pressing force in welding 44.9N/mm | 703 | 706 | 794 | n.d. | 197 | 598 | n.d. | 618 | 732 | 721 |
| | 0.2 mmt gap welding Pressing force in welding 44.9N/mm | 275 | 280 | 349 | n.d. | n.d. | 217 | n.d. | 159 | 352 | 354 |
| Compressive Strength (kPa) | Pressing force in welding 15.8N/mm | 845 | 877 | 883 | n.d. | n.d. | 382 | n.d. | 261 | 567 | 587 |
| Anti-bleed Performance | 120° C. × 8 h | ○ | ○ | ○ | n.d. | n.d. | × | × | ○ | ○ | ○ |
| Member I | Tm 1 (° C.) | 226.6 | 226.6 | 226.6 | 220.2 | 220.2 | 220.2 | 220.2 | 220.1 | 220.2 | 220.2 |
| | Tm 2 (° C.) | — | — | — | — | — | — | — | — | — | — |
| | Tc 1 (° C.) | 184.4 | 184.4 | 184.4 | 176.3 | 176.3 | 176.3 | 176.3 | 176 | 176.3 | 176.3 |
| | Tm-Tc (° C.) | 42.2 | 42.2 | 42.2 | 43.9 | 43.9 | 43.9 | 43.9 | 44.1 | 43.9 | 43.9 |
| | ΔHm (Mg) | 35.2 | 35.2 | 35.2 | 31.5 | 31.5 | 31.5 | 31.5 | 29.6 | 31.5 | 31.5 |
| Member II | Tm 1 (° C.) | 225.2 | 223.2 | 226.9 | 225.3 | 225.7 | 225.9 | 220.2 | 226.9 | 220.2 | |
| | Tm 2 (° C.) | — | — | — | — | — | — | — | — | — | |
| | Tc 1 (° C.) | 186.7 | 186.7 | 190.0 | 185.6 | 187.6 | 189.1 | 176.3 | 190.0 | 178.0 | |
| | Tm-Tc (° C.) | 38.6 | 36.5 | 36.9 | 39.7 | 38.1 | 36.8 | 43.9 | 36.9 | 42.2 | |
| | ΔHm (J/g) | 23.4 | 23.8 | 38.6 | 33.1 | 35.5 | 36.8 | 31.5 | 38.6 | 29.8 | |
| Relationship between Member I and Member II | Difference (Tm-Tc) between Member I Member II | 3.6 | 5.7 | 5.3 | 4.2 | 5.8 | 7.1 | 0.0 | 7.2 | 1.7 | |
| | Difference (ΔHm) between Member I-Member II | 11.8 | 11.4 | −3.4 | −1.6 | −4.0 | −5.3 | 0.0 | −9.0 | 1.7 | |

Reference Example

When the combination of Comparative Example 7 was employed and welded under conditions of power of 50 W, a scanning speed of 15 mm/s, irradiation energy of 3.33 J/mm, and a pressing force at the time of welding of 4.92 N/mm, the members were welded, and the welding strength and the compressive strength were 478 N and 678 N, respectively. Since the scanning time was long, the productivity was deteriorated. Also, a large quantity of welding burr was formed due to the condition of excessive energy irradiation, and a white powder adhered inside the welded body. Therefore, if an internal electronic board or the like is mounted, it was apprehended that an electronic circuit might be contaminated.

<Comprehensive Discussion>

On the basis of the above-described examples and results of tests performed by the present inventors so far, it is considered that the member I is preferably a resin containing, as a base resin, a polybutylene terephthalate copolymer resin having a transmittance of 5 to 90%, because it contains a laser transmissive/absorptive coloring material capable of transmitting and absorbing laser beam, and generates heat and melts while transmitting and absorbing the laser beam at the time of laser welding.

On the other hand, when any one of the following polybutylene terephthalate-based resins (B1), (B2) and (B3) is selected as the polyester-based resin B corresponding to the base resin of the member II, the warpage of the member II is reduced. It was found that a gap between the members I and II at the time of welding is thus reduced, and that hence the welding strength is increased while the residual stress is reduced.

(B1) a polybutylene terephthalate homopolymer;

(B2) a resin containing a polybutylene terephthalate homopolymer (B2-1) and at least one resin selected from the group consisting of a polyethylene terephthalate resin, a polycarbonate resin and an aromatic vinyl-based resin (B2-2); and (B3) a resin containing a polybutylene terephthalate copolymer resin (B3-1) and at least one resin selected from the group consisting of a polyethylene terephthalate resin, a polycarbonate resin and an aromatic vinyl-based resin (B3-2).

It is considered that the base resin of the member II is preferably any one of the polybutylene terephthalate-based resins (B1), (B2) and (B3) because the member II contains a laser absorptive coloring material not transmitting but capable of absorbing laser beam, absorbs laser beam at the time of laser welding, and melts and generates heat to transmit the heat to a transmissive material.

Accordingly, it was found that when a resin containing a polybutylene terephthalate copolymer resin is selected as the base resin of the member I and any one of the polybutylene terephthalate-based resins (B1), (B2) and (B3) is selected as the base resin of the member II, the bond strength can be further increased.

The invention claimed is:

1. A laser welded body, having a structure in which a member I and a member II are integrally bonded to each other,
    wherein the member I comprises:
        a polyester-based resin A comprising a polybutylene terephthalate copolymer resin, and
        0.0005 to 5.0 parts by mass, with respect to 100 parts by mass of the polyester-based resin A, of a coloring material capable of transmitting and absorbing laser beam (referred to as the "laser transmissive/absorptive coloring material"), and the member II comprises:
a polyester-based resin B, and
0.15 to 10.00 parts by mass, with respect to 100 parts by mass of the polyester-based resin B, of a coloring material capable of absorbing, but not transmitting, laser beam (referred to as the "laser absorptive coloring material"),
wherein the polyester-based resin B is different from the polyester-based resin A and comprises any one of the following resins (B2) and (B3):
(B2) a resin comprising a polybutylene terephthalate homopolymer (B2-1) and at least one resin (B2-2) selected from the group consisting of a polyethylene terephthalate resin, a polycarbonate resin and an aromatic vinyl-based resin; and
(B3) a resin comprising a polybutylene terephthalate copolymer resin (B3-1) and at least one resin (B3-2) selected from the group consisting of a polyethylene terephthalate resin, a polycarbonate resin and an aromatic vinyl-based resin.

2. The laser welded body according to claim 1, wherein the polyester-based resin A is a polybutylene terephthalate copolymer resin, or a resin comprising a polybutylene terephthalate copolymer resin and a polybutylene terephthalate homopolymer.

3. The laser welded body according to claim 2, wherein the polybutylene terephthalate copolymer resin used in the member I or the member II comprises isophthalic acid as a copolymer component, and a ratio of an isophthalic acid component in all carboxylic acid components is 1 to 30% by mole in terms of a carboxylic acid group.

4. The laser welded body according to claim 2, wherein the laser transmissive/absorptive coloring material comprises a mixture of azine-based compounds each having an azine skeleton.

5. The laser welded body according to claim 2, wherein the laser absorptive coloring material comprises carbon black.

6. The laser welded body according to claim 2, wherein the member I is a member capable of transmitting and absorbing laser beam, and the member II is a member capable of absorbing laser beam.

7. The laser welded body according to claim 1, wherein the polybutylene terephthalate copolymer resin used in the member I or the member II comprises isophthalic acid as a copolymer component, and a ratio of an isophthalic acid component in all carboxylic acid components is 1 to 30% by mole in terms of a carboxylic acid group.

8. The laser welded body according to claim 7, wherein the laser transmissive/absorptive coloring material comprises a mixture of azine-based compounds each having an azine skeleton.

9. The laser welded body according to claim 7, wherein the laser absorptive coloring material comprises carbon black.

10. The laser welded body according to claim 7, wherein the member I is a member capable of transmitting and absorbing laser beam, and the member II is a member capable of absorbing laser beam.

11. The laser welded body according to claim 1, wherein the laser transmissive/absorptive coloring material comprises a mixture of azine-based compounds each having an azine skeleton.

12. The laser welded body according to claim 11, wherein the laser absorptive coloring material comprises carbon black.

13. The laser welded body according to claim 11, wherein the member I is a member capable of transmitting and absorbing laser beam, and the member II is a member capable of absorbing laser beam.

14. The laser welded body according to claim 1, wherein the laser absorptive coloring material comprises carbon black.

15. The laser welded body according to claim 14, wherein the member I is a member capable of transmitting and absorbing laser beam, and the member II is a member capable of absorbing laser beam.

16. The laser welded body according to claim 1, wherein the member I is a member capable of transmitting and absorbing laser beam, and the member II is a member capable of absorbing laser beam.

* * * * *